US012053947B2

(12) United States Patent
Dubois et al.

(10) Patent No.: US 12,053,947 B2
(45) Date of Patent: Aug. 6, 2024

(54) METHOD FOR MANUFACTURING AND TRANSFERRING A MULTI-PLY LAMINATE, APPLICABLE TO THE MANUFACTURE OF ANNULAR REINFORCEMENTS FOR TIRES

(71) Applicant: Compagnie Generale Des Etablissements Michelin, Clermont-Ferrand (FR)

(72) Inventors: Clément Dubois, Clermont-Ferrand (FR); Olivier Fuchs, Clermont-Ferrand (FR); Yvan Lafontaine, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 156 days.

(21) Appl. No.: 17/781,819

(22) PCT Filed: Dec. 4, 2020

(86) PCT No.: PCT/FR2020/052279
§ 371 (c)(1),
(2) Date: Jun. 2, 2022

(87) PCT Pub. No.: WO2021/123541
PCT Pub. Date: Jun. 24, 2021

(65) Prior Publication Data
US 2022/0371296 A1        Nov. 24, 2022

(30) Foreign Application Priority Data

Dec. 20, 2019 (FR) ...................... 1915074

(51) Int. Cl.
*B29D 30/20* (2006.01)
*B29D 30/08* (2006.01)
*B29D 30/30* (2006.01)

(52) U.S. Cl.
CPC .... *B29D 30/3057* (2013.01); *B29D 2030/202* (2013.01)

(58) Field of Classification Search
CPC .... B29D 30/44; B29D 30/3007; B29D 30/28; B29D 30/08; B29D 30/20; B29D 30/30; B29D 30/3057
See application file for complete search history.

(56) References Cited

U.S. PATENT DOCUMENTS

| 3,841,941 A | 10/1974 | Leblond et al. |
| 4,276,104 A * | 6/1981 | Riggs ................. B29D 30/3007 156/405.1 |
| 2016/0229139 A1 | 8/2016 | Grolleman et al. |

FOREIGN PATENT DOCUMENTS

| EP | 0273847 A1 | 7/1988 |
| EP | 0714758 A2 | 6/1996 |
| EP | 1767337 A2 | 3/2007 |

* cited by examiner

*Primary Examiner* — Cedrick S Williams
(74) *Attorney, Agent, or Firm* — Dickinson Wright PLLC; Steven C. Hurles

(57) ABSTRACT

A first ply and then a second ply, which is superposed on the first ply, are produced on a hoop-type first support. The hoop-type first support has a first receiving surface, to form a laminate. The first and second plies forming the laminate are transferred onto an annular second receiving surface of a core so that the laminate is wrapped on the core until each ply is closed on itself and the laminate is thus closed on itself in a ring about the central axis of the core.

14 Claims, 8 Drawing Sheets

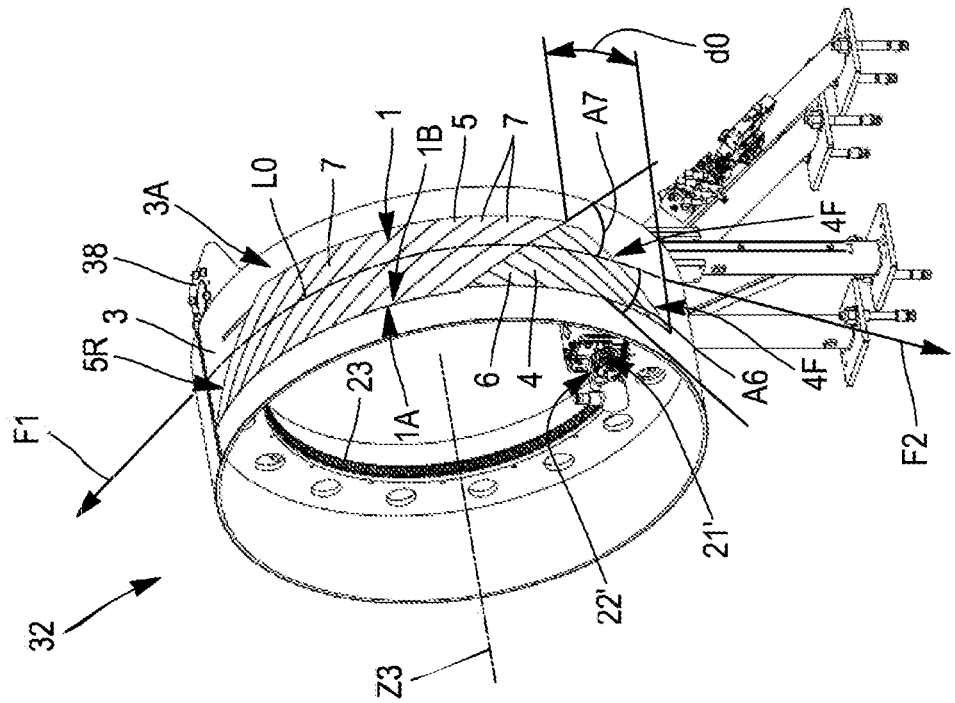
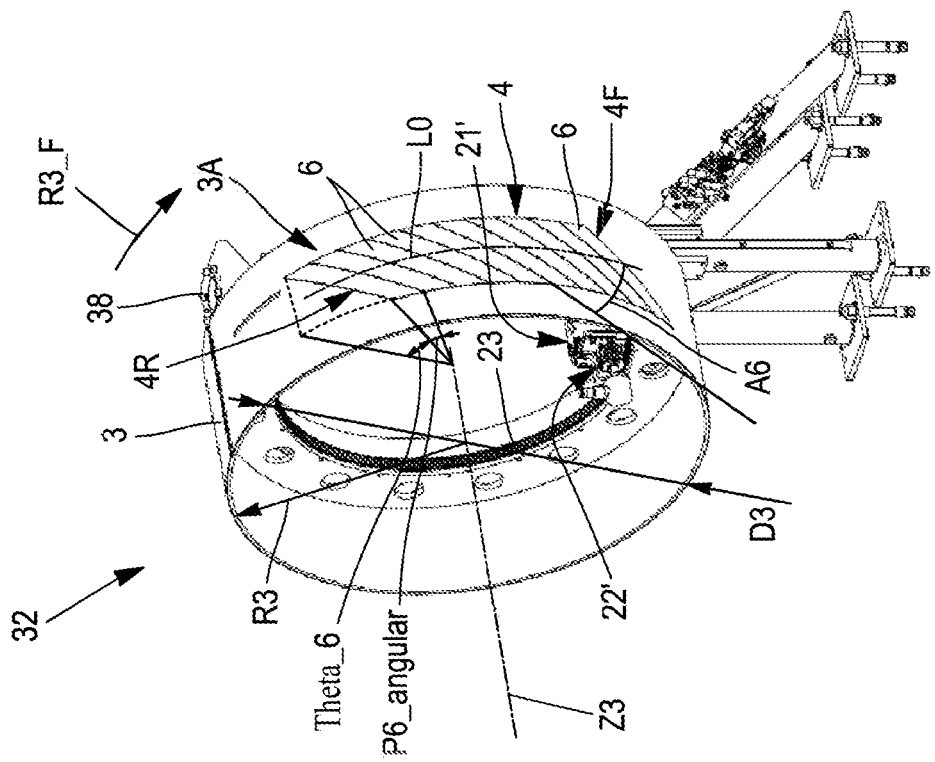

METHOD FOR MANUFACTURING AND TRANSFERRING A MULTI-PLY LAMINATE, APPLICABLE TO THE MANUFACTURE OF ANNULAR REINFORCEMENTS FOR TIRES

CROSS-REFERENCE TO RELATED APPLICATION

This application claims priority to and the benefit of PCT Patent Application No. PCT/FR2020/052279, filed Dec. 4, 2020, and entitled "METHOD FOR MANUFACTURING AND TRANSFERRING A MULTI-PLY LAMINATE, APPLICABLE TO THE MANUFACTURE OF ANNULAR REINFORCEMENT FOR TYRES," and to French Patent Application No. FR1915074, filed Dec. 20, 2019, and entitled "METHOD FOR MANUFACTURING AND TRANSFERRING A MULTI-PLY LAMINATE, APPLICABLE TO THE MANUFACTURE OF ANNULAR REINFORCEMENT FOR TYRES."

BACKGROUND

1. Field

The present disclosure relates to the general field of manufacturing pneumatic tires, and more particularly the reinforcing plies used in the formation of such pneumatic tires.

2. Related Art

It is known practice to produce reinforcing plies by placing a series of strips, butted together by their selvedges and each comprising parallel reinforcing threads embedded in an uncured rubber-based material, on a first support, known as the "assembly support", by means of an appropriate laying tool.

Such plies are then transferred individually, as they are completed, to a second drum- or core-type support, known as the "building support", which has a shape exhibiting symmetry of revolution that corresponds substantially to the dimensions, or even the shape, of the desired tire.

Each ply added in succession to the building support is wrapped so that it closes on itself in a ring on said building support, so that the leading edge and the trailing edge of said ply meet at a junction known as a "weld".

A reinforcing laminate is thus ultimately obtained on the building support, containing a plurality of individual plies superposed in successive annular layers.

Although such manufacturing methods offer in particular the advantage of great versatility, as it is easy to adapt the circumference of the building support and the corresponding length of the plies by adjusting in particular the number of strips laid, depending on the dimensions of the pneumatic tires to be produced, said methods can however have certain drawbacks.

Once the ply has been formed on the assembly support, it must be transferred to the building support, and the laying of the strips must therefore be interrupted for the time necessary to remove the ply and free said assembly support, which results in reduced output of the laying tool.

In addition, insofar as it is necessary to provide a plurality of separate work stations for assembling the plies by laying strips, and then conveying the plies to the building support using appropriate conveyors, and finally transferring and building the plies on said building support, the known tire manufacturing installations can have a relatively large footprint.

Finally, it is sometimes difficult to accurately and completely reproducibly carry out the welds on the ply edges in order to close each ply on itself on the building support. It is of course necessary to guarantee the quality of such welds to ensure that the tire is robust and meets the promised performance and safety standards. As a result, the welding operation frequently requires intervention by an operator to carry out or correct the weld manually in accordance with good practice, and/or to inspect said weld. It is therefore difficult to automate this phase of the manufacturing process.

SUMMARY

The objects assigned to the disclosure therefore aim to overcome the aforementioned drawbacks and propose a method for manufacturing an annular laminate suitable for use in the formation of a tire, in particular a pneumatic tire, providing increased accuracy and efficiency, and that can be implemented in an automated manner using a relatively compact installation.

The objects assigned to the disclosure are achieved by means of a method for manufacturing an annular laminate suitable for use in the formation of a tire, in particular a pneumatic tire, during which:
- a first ply, extending in a longitudinal direction from a first leading edge to a first trailing edge, is produced on a first support having a first receiving surface,
- then, on the same first support, a second ply is produced on top of the first ply, extending in the longitudinal direction from a second leading edge to a second trailing edge, so that a laminate is obtained on the first support, the thickness of which extends from a first face, applied against the first receiving surface, to an opposite second face, and comprising, in said thickness, at least a first layer, formed by the first ply, and a second layer, formed by the second ply, so that the first ply is sandwiched between the second ply and the first receiving surface,
- said laminate is then transferred to a second support, known as the "core", having a second receiving surface exhibiting symmetry of revolution centered on a central axis, said transfer being carried out by applying the second face of the laminate against the second receiving surface of the core and wrapping said laminate on the circumference of said second receiving surface until the second leading edge forms a join with the second trailing edge, thus closing the second ply on itself, and the first leading edge forms a join with the first trailing edge, thus closing the first ply on itself, so that said laminate is closed on itself in a ring about the central axis of the core.

Advantageously, implementing a multi-ply transfer, here two-ply, during which a plurality of plies are transferred simultaneously, here the simultaneous transfer of the first ply and the second ply, having first pre-formed the laminate by superposing said plies on a first support, so that the second ply at least partially overlaps and covers the first ply, makes it possible to save one transfer operation, compared with a method involving the sequential individual transfer of the first ply and then the second ply. The method according to the invention therefore makes it possible to increase efficiency.

In addition, such a method allows excellent control of the relative positioning of the first and second plies, in that the first and second plies are produced one on top of the other, on the same first support, in the same machine frame of reference, relative to the same common datum, before being transferred together in a laminated configuration within which the position of each ply is "fixed" relative to the position of the other ply.

The relative positioning of the edges of the first ply in relation to the edges of the second ply can thus particularly be controlled, and suitable azimuthal positioning about the central axis of the tire of the weld of the second ply relative to the weld of the first ply can thus be guaranteed, in particular in order to avoid superposing the welds in the same angular zone, and a high-quality individual weld can be carried out for each ply, so that each ply is completely closed on itself, despite the grouped transfer of the two plies. This control of the welds gives the annular laminate ultimately obtained excellent robustness and good balance.

BRIEF DESCRIPTION OF THE DRAWINGS

Further objects, features and advantages of the disclosure will become apparent in more detail on reading the following description and with the aid of the appended drawings, which are provided purely by way of non-limiting illustration, in which:

FIGS. 2A and 2B respectively illustrate detailed perspective views of the result of the production of the first ply and then the result of the production of the second ply on top of the first ply, on the hoop of the installation in FIG. 1.

DETAILED DESCRIPTION

The present disclosure relates to a method for manufacturing an annular laminate 1 suitable for use in the formation of a tire, in particular a pneumatic tire.

Preferably, said laminate 1 forms a reinforcing belt suitable for being placed in a crown block of the tire, under the tread. To this end, said laminate 1 preferably comprises reinforcing threads 8, for example made from metal, embedded in a rubber-based material, as will be described in detail below.

The disclosure also relates to an installation 2 making it possible to implement such a method, preferably automatically.

Figure 1:
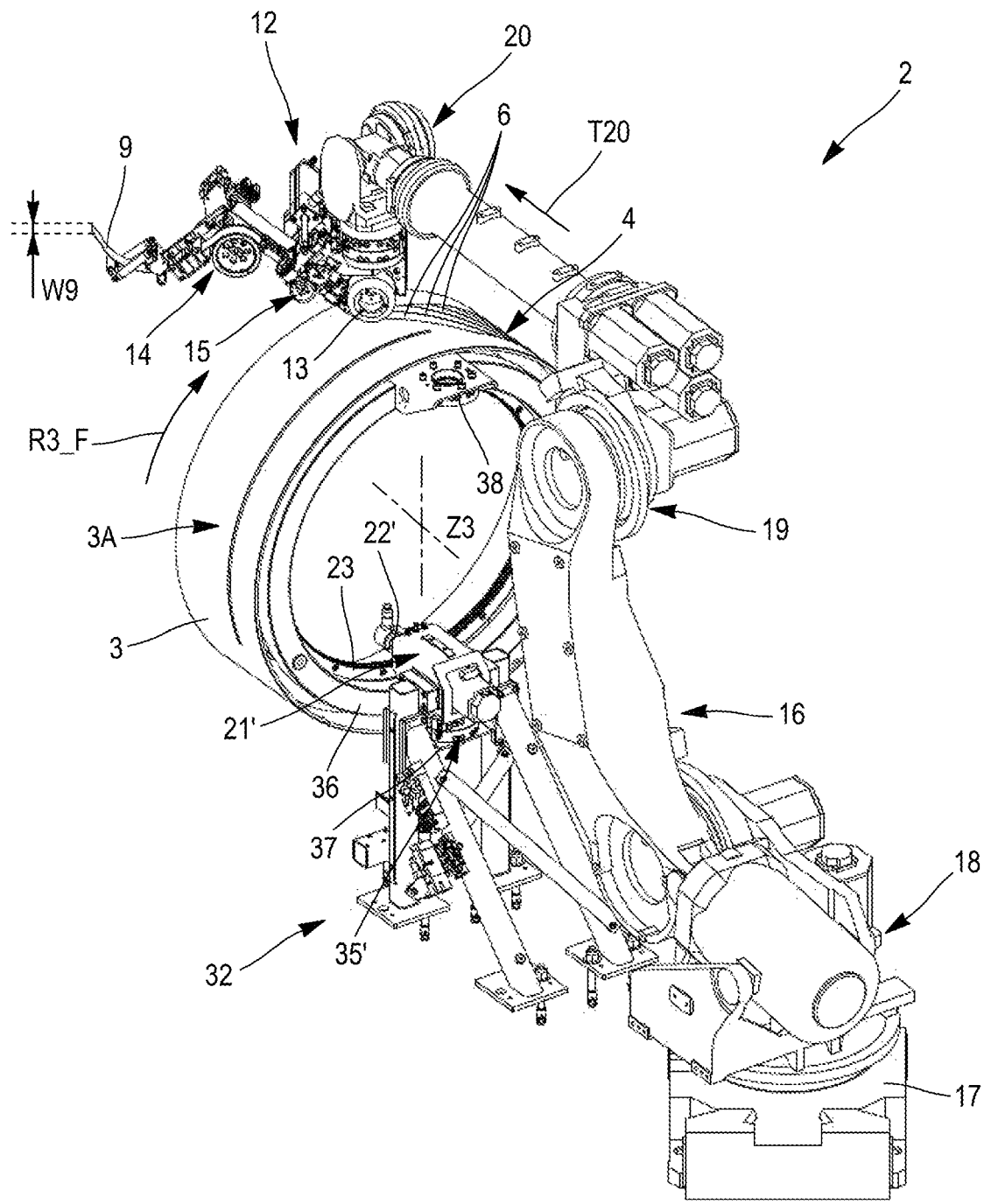
FIG. 1 illustrates a perspective view of part of an installation making it possible to implement a method according to the disclosure, said installation using a robotic arm, and shown here in the configuration for producing a first ply by laying strips on a first support formed by a hoop.

During the method, and as can be seen in particular in FIGS. 1 and 2A, a first ply 4, extending in a longitudinal direction L0 from a first leading edge 4F to a first trailing edge 4R, is firstly produced on a first support 3 having a first receiving surface 3A.

Said first support 3 preferably forms a cylindrical hoop 3, having a central hoop axis Z3 and preferably having a circular base. Said hoop 3 can be formed from an appropriate rigid material, in particular metal, for example steel or an aluminium or magnesium alloy. For ease of description, the first receiving support can be equated to a hoop 3 hereinafter.

A second ply 5, extending in the longitudinal direction L0 from a second leading edge 5F to a second trailing edge 5R, is then produced on the same first support 3, on top of the first ply 4 (in the direction of thickness).

Figures 7A, 7B:
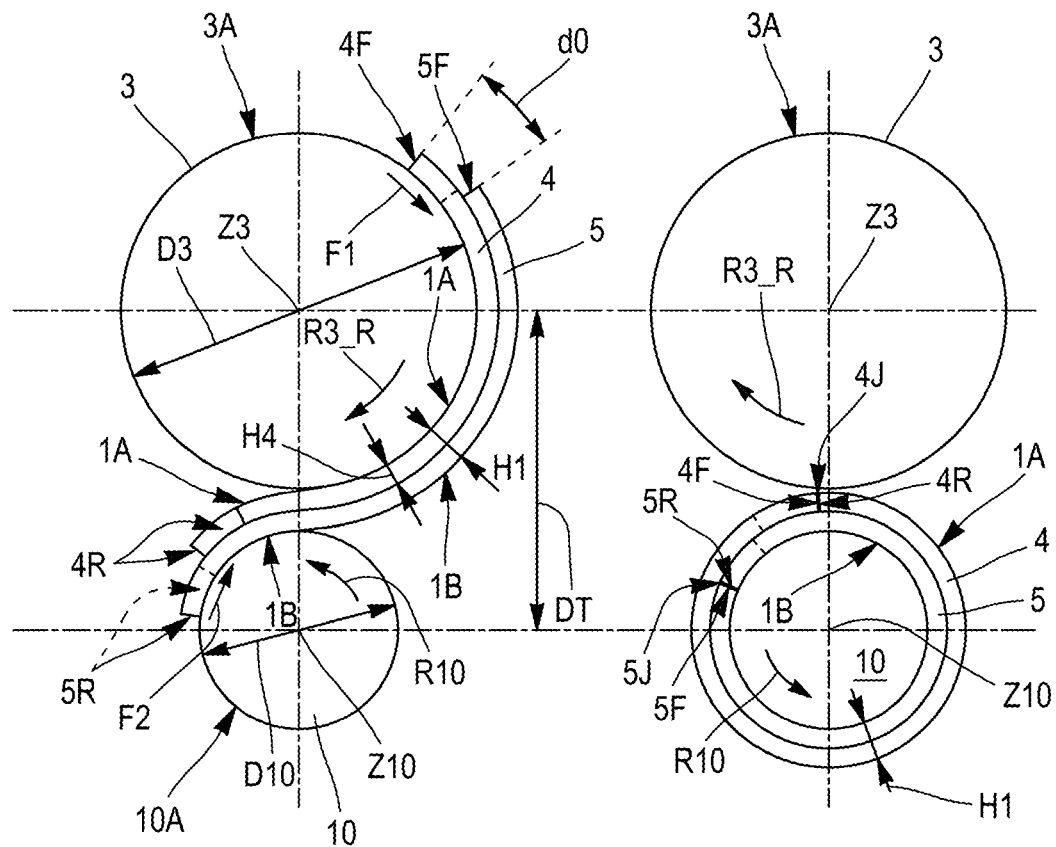
FIGS. 7A and 7B respectively illustrate schematic side views of how the laminate is turned over when it is transferred from the hoop onto the core at the start of the process, when the laminate starts to wrap around the core, and at the end of the process, when the laminate closes on itself thus completely wrapping the core over a full turn.
Figure 9:
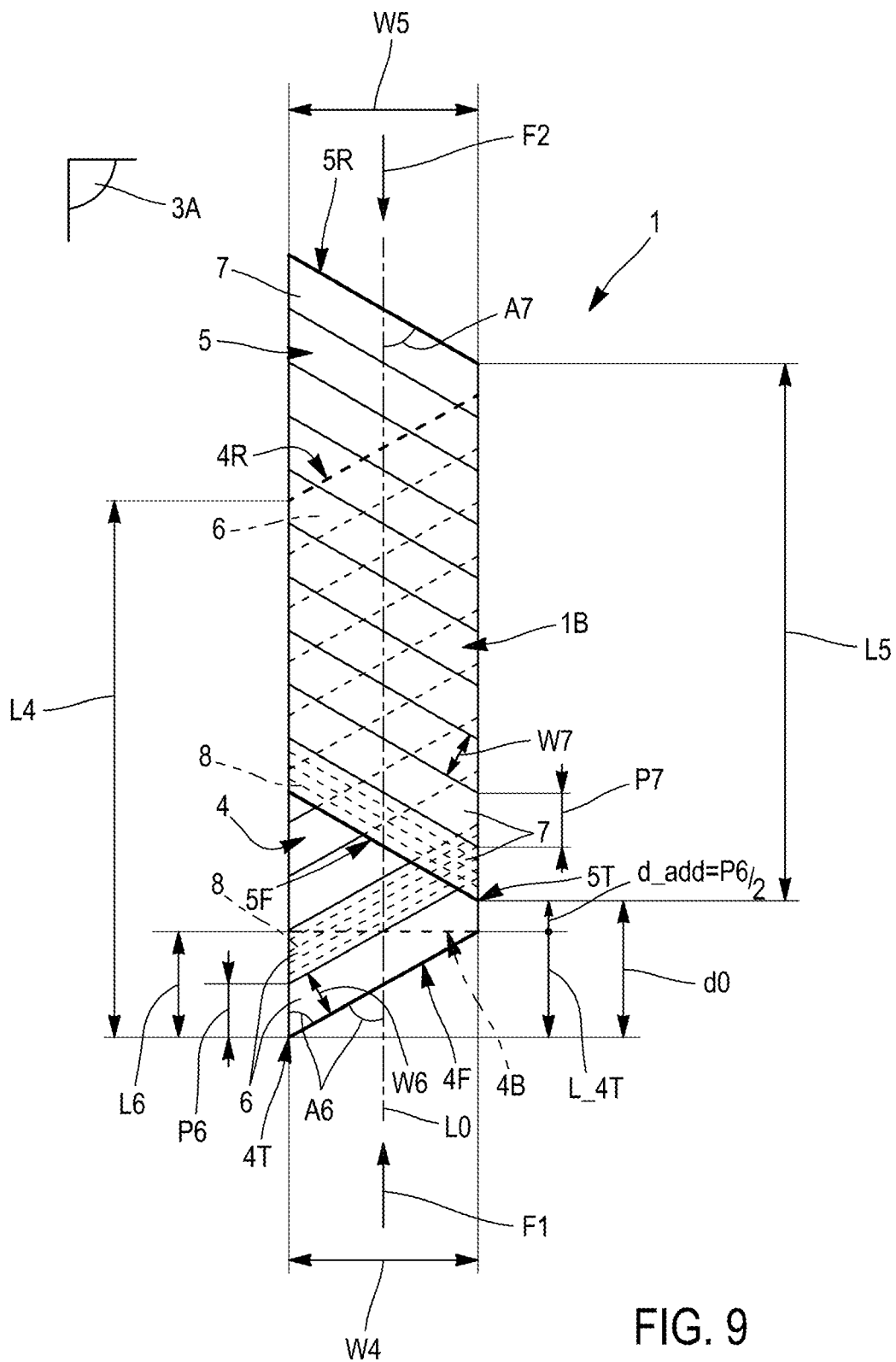
FIG. 9 illustrates an opened-out schematic top view of the positioning of the first ply and the second ply offset longitudinally relative to each other on the first support, to allow their respective edges to be connected when the laminate is completely wrapped on the core.

As can be seen in FIGS. 2B, 9 and 7A, a laminate 1 is thus obtained on the first support 3, the thickness H1 of which extends from a first face 1A, applied against the first receiving surface 3A, to an opposite second face 1B, and comprising, in said thickness H1, at least a first layer, formed by the first ply 4, and a second layer, formed by the second ply 5, so that the first ply 4 is sandwiched between the second ply 5 and the first receiving surface 3A.

Although they are produced in succession and therefore separately from each other, the first ply 4 and the second ply 5 thus overlap each other over a common portion of length, preferably over a common portion of length representing, along the longitudinal direction, more than 50%, or even more than 75%, of the individual length L4 of the first ply 4 and/or the individual length L5 of the second ply 5.

The invention therefore advantageously makes it possible to pre-form the laminate 1 on the first support 3, in an initial configuration in which said laminate 1 is open at its longitudinal ends, which correspond to the edges 4F, 4R, 5F, 5R of the first and second plies 4, 5.

More particularly, in this initial configuration, and while the first ply 4 is on the first support 3, said first ply 4 is in an open configuration, or even opened out flat, depending on the shape of the first support 3, that is, said first ply 4 is not closed on itself in a ring and, more particularly, the first leading edge 4F is not touching or overlapping the first trailing edge 4R, or overlapping or crossing the second trailing edge 5R of the second ply 5

Likewise, in said initial configuration, and while the second ply 5 is on the first support 3, said second ply 5 is in an open configuration, so that it is not closed on itself in a ring and, particularly, its second leading edge 5F is not touching or overlapping its second trailing edge 5R.

The first ply 4 and/or the second ply 5 is/are preferably formed from a rubber-based material, and more particularly an uncured rubber-based material, that is, non-vulcanized.

Preferably, the first ply 4 and, preferably, the second ply 5, contain reinforcing threads 8, preferably metal, embedded in the rubber-based material. Within each ply 4, 5, said reinforcing threads 8 are preferably arranged parallel to each other, obliquely relative to the longitudinal direction L0, so as to form a non-zero angle, known as the "ply angle" A6, A7 respectively, relative to said longitudinal direction L0.

In absolute terms, different ways of successively producing the first ply 4 and then the second ply 5 could be envisaged.

In particular, the first ply 4 could be produced in one piece, by cutting and removing from a base band or a base ply a sheet with the desired dimensions, shape and orientation of said first ply 4. Likewise, the second ply 5, or each of the first and second plies 4, 5, could be produced in one piece by cutting a base band or ply with sufficient dimensions.

However, preferably, as can be seen clearly in FIGS. 1, 2A and 9, the first ply 4 is produced by laying a first series of strips 6 on the first receiving surface 3A and butting them against one another.

Likewise, the second ply 5 is preferably produced by laying a second series of strips 7 on the first ply 4 and butting them against one another.

Such a solution is very versatile, as it makes it possible to produce plies 4, 5 having a freely selected width W4, W5 and length L4, L5, on demand and with almost no material wastage.

In a manner known per se, the strips 6 and 7 respectively are juxtaposed edge to edge, butted together by their lateral selvedges.

The strips 6, 7 are preferably made from a rubber-based composition, and more particularly an uncured rubber-based composition, that is, non-vulcanized.

Preferably, the strips 6, 7 contain reinforcing threads 8, which are arranged parallel to each other in the direction of the length of the strips 6, 7, here parallel to the lateral selvedges, and are preferably continuous over the entire length of each strip considered, as shown with dashed lines in FIG. 9.

Said reinforcing threads 8 are preferably embedded in the rubber-based composition.

Said reinforcing threads advantageously improve the tensile strength of the strip 6, 7.

The reinforcing threads 8 can preferably be metal, or if applicable can be made from any other suitable material, in particular textile, having a Young's modulus greater than a selected threshold, in order to give the strip 6, 7 high longitudinal tensile stiffness (in the direction of said reinforcing threads), greater than the stiffness of the vulcanized rubber composition considered alone, or even almost complete longitudinal tensile inextensibility.

Such reinforced strips 6, 7 can advantageously be used to produce one or more reinforcing plies 4, 5, or "crown plies", which can for example advantageously be combined, by superposition, with a carcass ply having a radial structure, to give the crown of the tire the desired mechanical strength.

Regardless of the intended use of the first or second ply 4, 5 and the value of the corresponding ply angles A6, A7, the strips 6, 7 can for example be made by cutting a continuous band 9, also known as the "straight-thread band", into sections having a predetermined length corresponding to the desired length of the strips 6, 7.

Said continuous band 9 can for example be obtained, in a manner known per se, by calendering, unwinding reinforcing threads 8 parallel to each other and trapping them between two thin layers of rubber pressed against each other by two counter-rotating calender rolls.

Preferably, the strips 6 forming the first ply 4 and the strips 7 forming the second ply 5 originate from the same continuous band 9, and are therefore the same thickness.

More generally, the first ply 4 and the second ply 5 are preferably both the same thickness, equal to the thickness of the strips 6, 7 forming them.

Likewise, the width W6 of the strips 6 forming the first ply 4, considered perpendicular to the longitudinal direction of the strips 6 and reinforcing threads 8, is preferably identical to the width W7 of the strips 7 forming the second ply 5, and equal to the width W9 of the continuous band 9.

In addition, as can be seen clearly in FIGS. 2B and 9, the strips 6 forming the first ply 4 are preferably laid at a first angle A6 known as the "first ply angle" A6 that is non-zero relative to the longitudinal direction L0, while the strips 7 forming the second ply 5 are laid at a second angle A7, known as the "second ply angle" A7 that is different from the first ply angle A6 so that the strips 7 forming the second ply 5 form a crossed structure with the strips 6 forming the first ply 4.

In practice, the first and second ply angles A6, A7 correspond to the orientation of the reinforcing threads 8 within the first ply 4 and the second ply 5 respectively, relative to the longitudinal direction L0 common to the first ply 4 and the second ply 5, and projecting in a plane tangent to the first receiving surface 3A at the point under consideration.

The crossed structure of the plies 4, 5 within the laminate 1 can in particular make it possible to create, in combination with other reinforcing threads belonging to a carcass ply, triangular reinforcing structures within the crown of the tire.

The second ply angle A7 is preferably of the opposite sign to the first ply angle A6, relative to the longitudinal direction L0.

By way of example, the absolute value of said ply angles A6, A7 can preferably be between 5 degrees and 90 degrees, more preferably between 10 degrees and 60 degrees, in particular between 20 degrees and 50 degrees, or even between 25 degrees and 45 degrees. The ply angles A6, A7 can for example equal 25 degrees (±1 degree), 33 degrees (±1 degree) or 45 degrees (±1 degree).

The value of the ply angle A6, A7 can be selected in particular as a function of the width W4, W5 of the ply under consideration.

According to possible embodiments, a ply angle A6, A7 equal to 25 degrees (±1 degree) can in particular be selected for a ply width W4, W5 of between 200 mm and 260 mm, for example for a ply 4, 5 having a width W4, W5 of 205 mm or 255 mm, or a ply angle A6, A7 equal to 33 degrees (±1 degree) for a ply width W4, W5 of between 200 mm and 400 mm, for example for a ply having a width W4, W5 of 205 mm, 255 mm, 265 mm or 370 mm, or a ply angle A6, A7 equal to 45 degrees (±1 degree) for a ply width W4, W5 of between 260 mm and 400 mm, for example having a width of 265 mm or 370 mm.

Even more preferably, the second ply angle A7 can have the same absolute value as the first ply angle A6, with the opposite sign.

Preferably, the first and second plies 4, 5 and more particularly the strips 6, 7 are laid on the first support 3 using a laying tool 12, or "laying head" 12.

Said laying tool 12 can comprise, as illustrated in FIG. 1, a pressing roller 13 making it possible to press the strips 6, 7 against the first receiving surface 3A.

The laying tool 12 can further comprise a feeding device 14 making it possible to feed the continuous band 9 to the pressing roller 13, and a cutting device 15 making it possible to cut the continuous band 9 transversely in order to detach the strips 6, 7 therefrom.

The cutting device 15 can preferably comprise two counter-rotating cylinders, the parallel axes of rotation of which are arranged perpendicular to the longitudinal direction of travel of the continuous band 9, and which are each provided on their surface with a helical blade centered on their axis of rotation, so that the rotation of said cylinders in the opposite direction to each other causes said conjugate helical blades to interact and thus bring about, by shearing, the transverse cutting of the continuous band 9, from one lateral edge of said continuous band 9 to the other lateral edge.

By adjusting the synchronization ratio between the rotating speed of the helical blades and the longitudinal speed of travel of the continuous band 9, the bevel angle at which said continuous band 9 is to be cut in order to divide it into successive strips 6, 7 can be set. In practice, the value of this bevel angle is selected to equal the value of the desired ply angle A6, A7.

The laying tool 12 is preferably held by a robotic arm 16, making it possible to move said laying tool 12 relative to the first support 3.

More particularly, said robotic arm 16 makes it possible to translate the laying tool 12 in a straight line in a direction parallel to the central hoop axis Z3, while the hoop 3 is driven in a rotational movement R3_F about said central axis Z3. The combination of these two simple, stable movements makes it possible to lay the strips 6, 7 on the receiving surface 3A of the hoop 3, giving said strips 6, 7, their desired ply angle A6, A7. The yaw angle of the pressing roller 13 is of course suitable for the required ply angle A6, A7.

Preferably, the robotic arm 16 is anthropomorphic, with six axes, comprising in succession a base 17 provided with a shoulder joint 18, then an elbow joint 19 and finally a wrist joint 20 to which the laying tool 12 is attached.

It will be noted that, in order to limit the influence of gravity and thus increase the accuracy and stability during the formation of the plies 4, 5, the strips 6, 7 are laid on the hoop 3 in a configuration in which, as can be seen in FIG. 1, the hoop 3 is placed vertically, so that it rotates about a horizontal central hoop axis Z3, while the robotic arm 16 holds the laying tool 12 suspended, with the wrist 20 bent downwards, and brings said laying tool 12 above the hoop 3, pressing on the highest point of the receiving surface 3A. The hoop 3 thus advantageously provides vertical support for the laying tool 12 while the arm 16 carries out translational movements of the laying head 12 parallel to the central hoop axis Z3.

The hoop 3 carries out a series of alternating rotational movements allowing the laying of a strip 6, then back to the starting point of the next strip 6, angularly offset and incremented relative to the starting point of the previous strip by a predetermined pitch value P6, then the laying of the next strip, etc.

Once the first ply 4 has been formed, that is, once all of the corresponding strips 6 have been laid and butted together on the hoop 3, the hoop 3 will turn back on itself so that it is placed at the starting point of the second ply 5. When the yaw angle of the pressing roller 13 has been adjusted to the second ply angle A7, the laying can start of the strips 7 that are superposed on the first ply 4 and butted together at a predetermined laying pitch P7, as can be seen in FIG. 9.

According to the method, when the laminate 1 containing the first ply 4 and the second ply 5 has been produced on the first support 3, the laminate 1 is transferred to a second support 10, known as the "core" 10, which has a second receiving surface 10A exhibiting symmetry of revolution centered on a central axis Z10.

The first ply 4 and the second ply 5 are thus transferred together from the first support 3 to the second support 10.

Figures 8A, 8B, 8C, 8D, 8E:
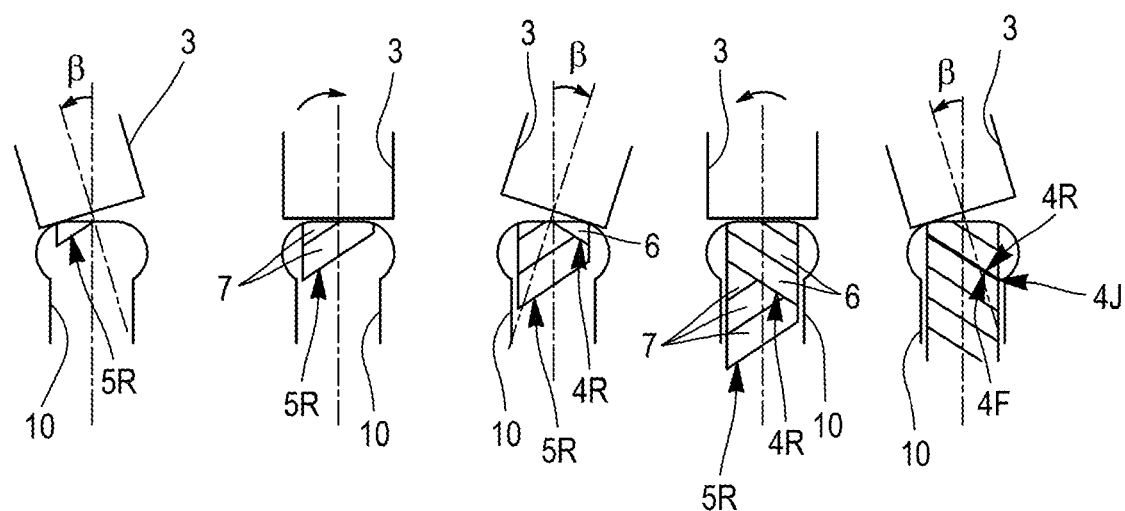
FIGS. 8A, 8B, 8C, 8D and 8E illustrate schematic front views of the transfer of the laminate from the hoop onto the core, during which the hoop is progressively roll-tilted relative to the core in order to effectively press the tips of the plies against the curved shoulders of the core.

Said transfer is carried out by applying the second face 1B of the laminate against the second receiving surface 10A of the core 10 and wrapping said laminate 1 on the circumference of said second receiving surface 10A until the second leading edge 5F forms a join 5J with the second trailing edge 5R, thus closing the second ply 5 on itself, it having been open until this point, and the first leading edge 4F forms a join 4J with the first trailing edge 4R, thus closing the first ply 4 on itself, it having been open until this point, so that, more generally, said laminate 1 is closed on itself in a ring about the central axis Z10 of the core, as can be seen in particular in FIGS. 7B and 8E.

The closure of the laminate 1 on itself, and more particularly the closure of the plies 4, 5 forming the different layers of said laminate, into an annular belt forming a simple, single-turn loop about the central axis Z10 of the core, on the annular second receiving surface 10A, can thus advantageously be achieved in a single particularly fast and simple transfer operation.

The simultaneous transfer and butting of the two layers of plies 4, 5 forming the laminate 1 advantageously makes it possible to reduce the manufacturing cycle time of the laminate, and more generally the manufacturing cycle time of the tire, by saving a transfer operation compared to a known method involving a sequential procedure according to which each ply would be transferred individually immediately after the assembly of said ply.

In addition, such a method makes it possible to accurately control the relative positioning, and more particularly the longitudinal positioning, in the longitudinal direction L0, of the first ply 4 and the second ply 5 within the laminate 1, because the two plies are produced on the same first support 3, therefore with the advantage of the same machine frame of reference, the same calibration and in particular the same machine datum setting relating to said first support 3 for the successive assembly of the two plies 4, 5.

Advantageously, controlling the positioning of the first and second plies 4, 5 also makes it possible to control the relative position, as well as the quality, of the welds 4J, 5J, that is, the joins 4J, 5J between the leading and trailing edges 4F, 4R of the first ply 4 and the leading and trailing edges 5F, 5R of the second ply 5 respectively, once the plies have been wrapped about the central axis Z10 of the core.

More particularly, as the longitudinal overlap between the first ply 4 and the second ply 5 is only partial, as will be described in detail below, the respective edges 5F, 5R of the second ply 5 are longitudinally offset relative to the corresponding edges 4F, 4R of the first ply 4, so that the welds 4J, 5J are angularly offset relative to each other azimuthally about the central axis Z10 of the core, which avoids the creation of a weak zone in the annular laminate 1.

The respective lengths L4, L5 of the first ply 4 and of the second ply 5 are of course adjusted, when said plies are assembled on the first support 3, so that they correspond to the developed length of the circumference of the core 10 on which said plies are wrapped, so that each of the first and second plies 4, 5 exactly covers, from its leading edge 4F, 5F to its trailing edge 4R, 5R, one, and only one, full turn azimuthally about the central axis Z10 of said core 10.

It will be noted that the core 10 has dimensions, and in particular an overall diameter D10 relative to the central axis Z10, corresponding to the desired final dimensions of the tire.

The core 10 can thus preferably be used as a curing core, which is introduced as it is into a curing press in order to vulcanize the laminate 1 in its annular form.

More preferably, when the laminate 1 has been wrapped on the core 10, additional layers can be placed on the same core 10 by wrapping, in particular layers of rubber-based material suitable for forming a tread, and then the assembly can be sent for curing, in order to vulcanize the tire as a whole on said core 10.

Figure 5:
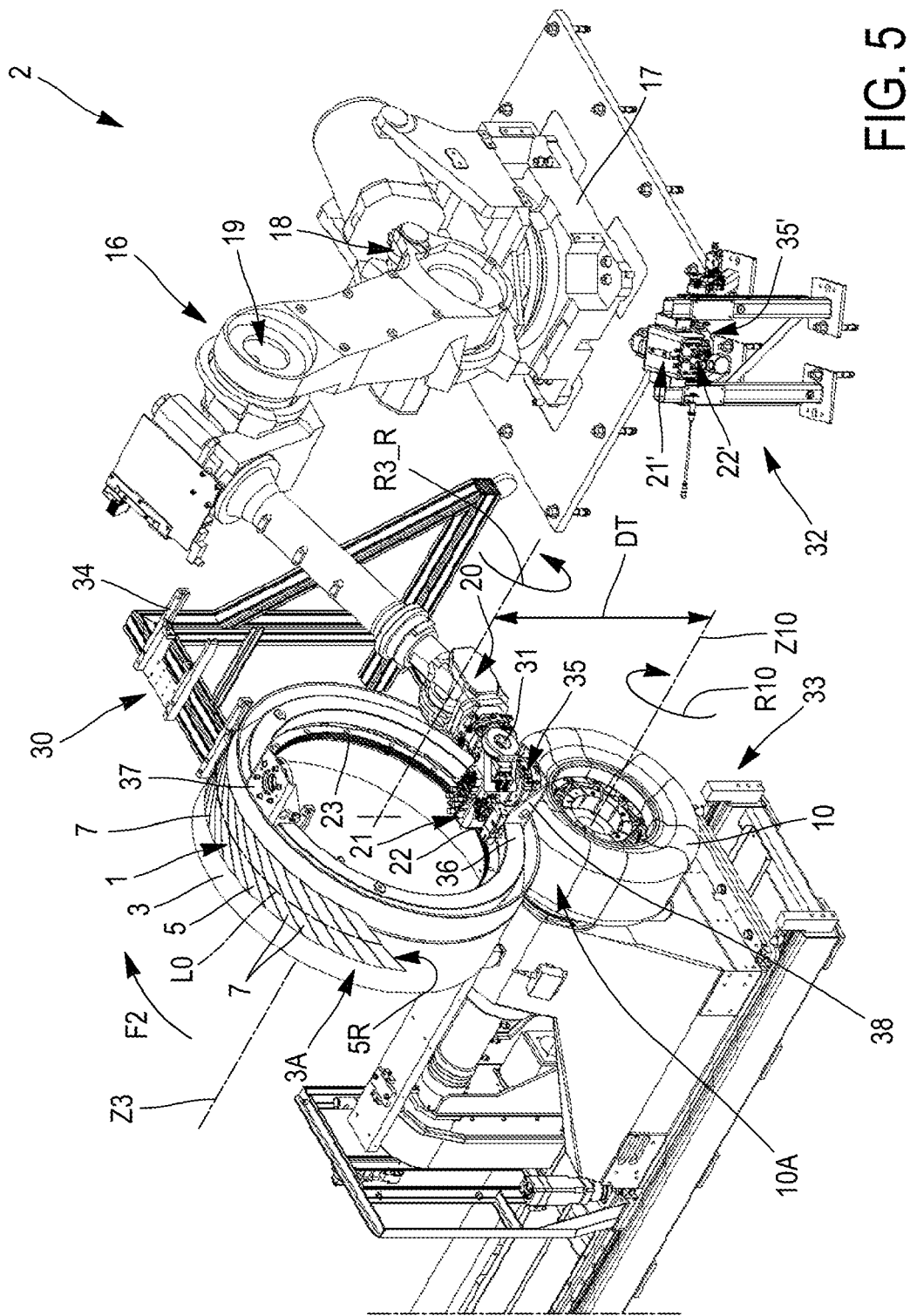
FIG. 5 illustrates a general perspective view of the installation in FIG. 3 in a transfer configuration in which the robotic arm presses the hoop against the core.
Figure 6:
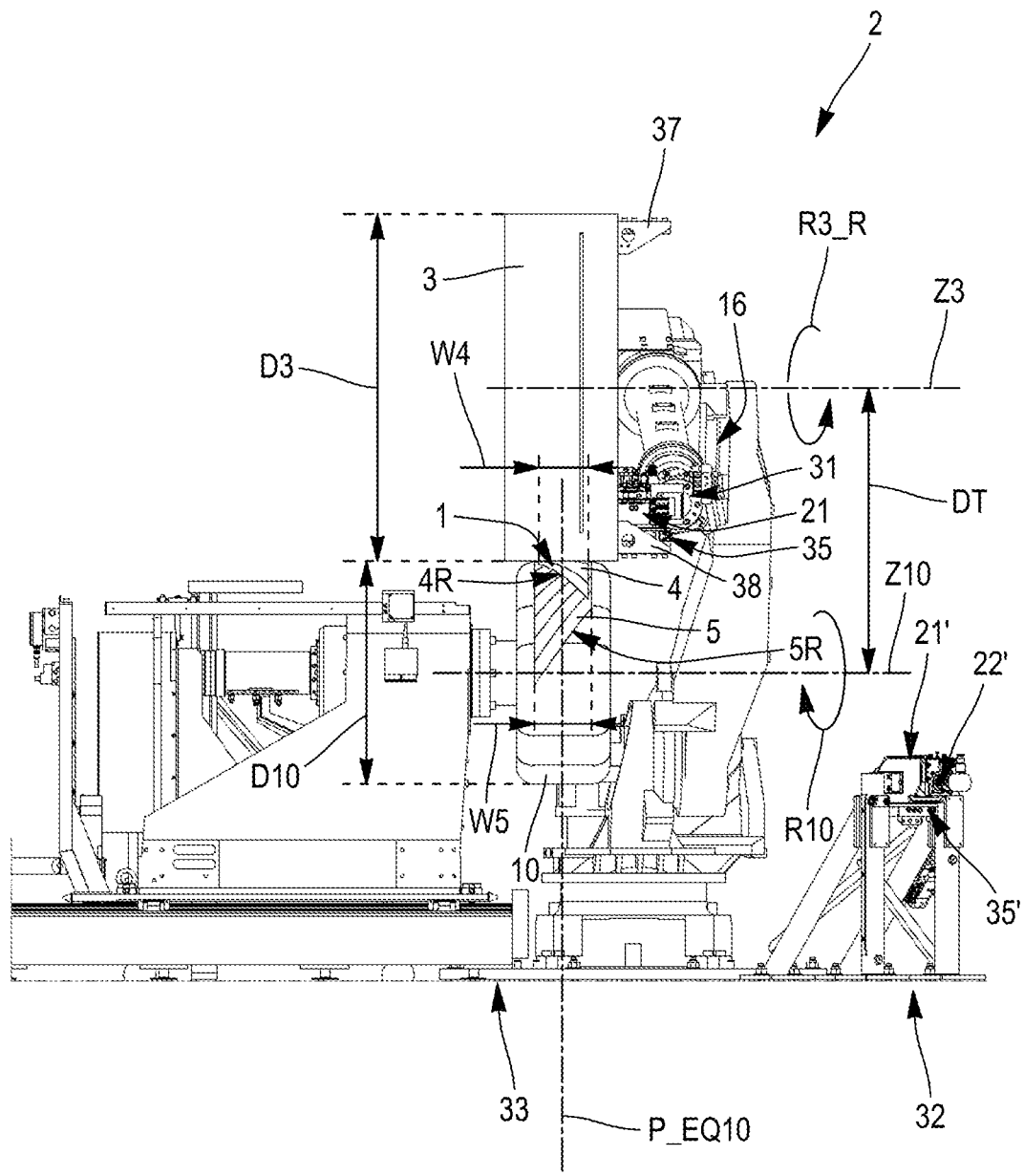
FIG. 6 illustrates a front view of the installation in FIGS. 1 and 3 during the transfer of the laminate from the hoop onto the core.

Preferably, as can be seen in FIGS. 5, 6 and 7A, the transfer takes place by contact, by bringing the first support 3, holding the laminate 1, close to the core 10 so that the second face 1B of the laminate 1 adheres to the second receiving surface 10A of said core 10, and then imparting a relative movement R3_R, R10 to the first support 3 and the second support 10, known as the "transfer movement" R3_R, R10, which makes it possible to unwrap and detach the laminate 1, and more particularly the first face 1A of said laminate 1, from the first receiving surface 3A of the first support 3, while simultaneously wrapping the laminate, via its opposite face 1B, on the second receiving surface 10A of the core 10.

It will be noted that, in doing this, the transfer is accompanied by the switching of the laminate 1, in that the face 1B of the laminate initially visible on the first support 3, becomes the hidden face coming into contact with the second support 10, and conversely, the initially hidden face 1A, resting on the first support 3, becomes the radially outer visible face on the second support 10.

Following this switch, the annular laminate 1 is oriented, on the core 10 and then as a result within the finished tire, so that the second ply 5 forms a cylinder closer to the central axis Z10 than the cylinder formed by the first ply 4, that is, the second ply 5 is oriented radially inwards while the first ply 4 is oriented radially outwards, in the opposite orientation to the laminate 1 during assembly on the first support 3.

The transfer movement preferably results from the combination of two adjacent simultaneous movements, namely a movement R3_R of the first support 3, here a rotational movement R3_R of the hoop 3, and a movement R10 of the second support 10, the two supports 3, 10 thus being set in active motion relative to the frame of the installation 2.

It will be noted that, preferably, as the length L4, L5 of each of the plies 4, 5 is sized during the assembly of the ply on the first support 3 so that it corresponds exactly to the length necessary for wrapping on the core 10, it is advantageously not necessary to perform any stretching or longitudinal compression of the laminate 1 during transfer in order to adjust the length of said laminate 1 to the developed length of the second receiving surface 10A.

As a result, advantageously, the transfer movement R3_R, R10 can correspond to a relative rolling movement without sliding, the developed length of the first receiving surface 3A passing by per unit of time in this transfer movement being equal to the length of the second receiving surface 10A passing by during this same unit of time. In other words, the movement of the second support 10 can therefore be synchronized with the movement of the first support 3, without it being necessary to slow the first support 3 relative to the second support 10 in order to stretch the laminate, or conversely to accelerate it in order to compress the laminate 1.

In absolute terms, the use of a table or conveyor belt first support 3 could be envisaged, which would thus provide a substantially flat first receiving surface 3A.

In this case, the transfer could be carried out by bringing the flat first receiving surface 3A close to the circumference of the core 10 at a tangent, and therefore at a tangent to the cylindrical second receiving surface 10A.

However, the first support 3 preferably exhibits symmetry of revolution and is preferably, as stated above, formed by a circular cylindrical hoop 3, centered on an axis known as the "central hoop axis" Z3, the radially outer surface of which forms the first receiving surface 3A.

On the first support 3A, the first ply 4A thus occupies a radially inner position relative to the second ply 5, which occupies a radially outer position.

Advantageously, the transfer can then be carried out by applying said hoop 3 holding the laminate 1 against the core 10 so that the laminate 1 is sandwiched between the first receiving surface 3A of the hoop 3 and the second receiving surface 10A of the core 10, and then setting the hoop 3 and the core 10 in relative counter-rotational motion R3_3, R10.

During the transfer, the hoop 3 thus performs a rotational movement R3_R in one direction, while the core 10 performs a rotational movement R10 in the opposite direction, so that the hoop 3 and the core 10 perform a rolling movement relative to each other.

The hoop 3 comes into tangential contact with the core 10 so that, when the laminate 1 passes from the first receiving surface 3A to the second receiving surface 10A, the curvature of said laminate is reversed.

Advantageously, the laminate 1 is thus progressively and gently detached from the hoop 3 by peeling, to approach the core 10 tangentially.

Such a transfer by unwrapping/wrapping with reversal of the curvature of the laminate 1 advantageously takes place without impact, but also without the laminate 1 being released from the receiving surfaces 3A, 10A to which said laminate adheres.

Such a cylinder-to-cylinder, rather than cylinder-to-flat, pressure transfer, also makes it possible to improve control of the contact pressures.

The invention generally therefore makes it possible to improve transfer quality and reproducibility.

The hoop 3 is preferably magnetized, to ensure that the strips 6, 7 and more generally the laminate 1 are held by attraction of the metal reinforcing threads 8 during the laying of the strips 6, 7 when the plies 4, 5 are produced and then when the hoop 3 is transported to the core 10.

Preferably, the adherence of the laminate 1 on the second receiving surface 10A of the core 10 takes place by affinity, due to the intrinsic tack of the rubber forming the second ply 5 of said laminate 1.

Preferably, the magnetization of the hoop 3 will be designed so that the magnetic field is sufficient to ensure that the laminate 1 is held on the hoop 3 during the laying of the strips 6, 7 and then during the movement of the hoop 3 to the core 10, but nevertheless weaker than the forces of adhesion of the laminate 1 due to tack on the core 10, so that the laminate 1 can detach progressively from the hoop 3 as said laminate 1 wraps around the core 10 during the transfer.

During the transfer, the central hoop axis Z3 and the central core axis Z10 are preferably contained in the same plane, here a vertical plane in FIGS. 5, 6 and 7A, or these central axes Z3, Z10 are even collinear (parallel).

The distance between the first support 3 and the second support 10, and more particularly the center-to-center distance DT between the central hoop axis Z3 and the central core axis Z10, is preferably defined so that the laminate 1 can be pressed, in the direction of its thickness H1, between the first support 3 and the second support 10, with a degree of compression suitable for the transfer.

By way of example, the center-to-center distance DT between the hoop axis Z3 and the core axis Z10 during the transfer is preferably equal to the sum of the radii of the first and second receiving surfaces 3A, 10A, and the thickness H1 of the laminate 1, that is preferably here the cumulative thickness of the first and second plies 4, 5, minus a correction value intended to ensure the compression of the laminate 1 against the second receiving surface 10A, by elastic sandwiching between the first receiving surface 3A and the second receiving surface 10A. Said correction value can be between 0.5 and 1 mm, for example equal to 0.8 mm.

The correction value can further depend on the structural stiffness of the hoop 3, and the structural stiffness of the core 10.

The rotating speeds R3_R of the hoop 3 and R10 of the core 10 are synchronized according to a selected synchronization ratio.

This synchronization ratio can optionally vary during the transfer. This variation of the synchronization ratio advantageously makes it possible, as required, to stretch the laminate 1 to a greater or lesser extent during the transfer, so as to adjust the developed length of said laminate 1 to the perimeter of the core 10 if necessary, and thus make it possible to close the laminate 1 accurately on itself by joining together the ends (leading and trailing edges) of each of its constituent plies 4, 5.

However, as will be described in detail below, the method advantageously makes it possible to assemble each of the first and second plies 4, 5 to the exact length L4, L5 desired, which coincides with the corresponding developed length of the core 10, and is therefore just necessary and sufficient to allow an edge-to-edge join of the leading edge 4F, 5F of each ply with the corresponding trailing edge 4R, 5R at the end of one wrapping turn on the core 10.

The synchronization ratio between the rotating speed R3_R of the hoop 3 and the rotating speed R10 of the core 10 can therefore preferably be constant during the transfer.

It will be noted that it is all the more beneficial not to have to stretch the laminate 1 while it is being wrapped on the core 10 given that said laminate 1 has relatively high stiffness because it contains several superposed plies 4, 5, which would complicate the management of any stretching.

Furthermore, in order to make the transfer possible, the laminate 1 must remain open on the hoop 3, so that the longitudinal ends of said laminate do not overlap on the first receiving surface 3 of said hoop and can thus be detached from said hoop 3 separately and in succession to reach the core 10, without interfering with each other prematurely.

The hoop 3 therefore has a circumference that is strictly greater than the circumference of the core 10.

In other words, the first receiving surface 3A of the hoop 3 has a perimeter that is strictly greater than the total length of the laminate 1 to be produced and transferred, and therefore a diameter D3 that is strictly greater than the diameter D10 of the second receiving surface 10A of the laying core 10, the perimeter of which is equal to the length of the laminate 1.

The hoop 3 is sized so that the laminate 1 assembled on said hoop covers, from a leading longitudinal end of the first ply 4 (here typically a first tip 4T of the first leading edge 4F) to another trailing longitudinal end of the second ply 5 (here typically a tip of the second trailing edge 5R) furthest from (along the laminate 1) the leading longitudinal edge of the first ply 4, an overall angular sector that is strictly less than 360 degrees and, more preferably, between 90 degrees and 320 degrees, for example between 120 degrees and 300 degrees, about the central axis Z3 of said hoop.

This will thus provide, on the receiving surface 3A of the hoop that is not covered by the laminate 1 and between the first leading edge 4F of the first ply and the second trailing edge 5R of the second ply 5, a minimum separation distance between the ply edges 4F, 5R that makes it possible to hold the open laminate about the central axis Z3 of the hoop, while avoiding the free ends of said laminate 1 touching.

By way of example, and in particular for laminates 1 intended for the manufacturing of tires suitable for 14 inch to 24 inch rims, and more particularly 16 inch to 20 inch rims, this minimum separation distance, which corresponds to the measurement of the arc separating, in a given axial position along the central hoop axis Z3, the first ply leading edge 4F from the second ply trailing edge 5R, and which is not therefore covered by the laminate 1, is equal to or greater than 40 mm.

More generally, provision can be made for the arc length considered on the receiving surface 3A of the hoop and which corresponds to the minimum separation distance between the end tips of the laminate 1 to cover an angular sector (free of laminate), considered azimuthally about the central hoop axis Z3, of at least 5 degrees, at least 10 degrees, at least 40 degrees, or even at least 60 degrees.

In addition, as stated above, the overlap length common to the first and second plies 4, 5 is preferably strictly less than the respective individual length L4, L5 of each of said plies 4, 5 so that said first and second plies 4, 5 only overlap partially, in the lengthwise direction thereof.

More preferably, on the first support 3, regardless, incidentally, of the arrangement of said first support 3, and as can be seen in FIGS. 2B, 7A and 9, the second ply 5 has a longitudinal offset d0 relative to the first ply 4, so that, travelling along the laminate 1 along the longitudinal direction L0 in a first direction F1, known as the "assembly direction" F1, the first leading edge 4F, with which the first ply 4 starts, precedes the second leading edge 5F, with which the second ply 5 starts, so that the first ply 4 remains visible and not covered by the second ply 5 between the first leading edge 4F and the second leading edge 5F, while the first trailing edge 4R, with which the first ply 4 ends, precedes the second trailing edge 5R, with which the second ply 5 ends, so that the second ply 5 covers the first trailing edge 4F of the first ply 4, and extends longitudinally beyond the first ply 4.

Advantageously, this longitudinal offset d0 makes it possible in particular to position the respective welds 4J, 5J of the first ply 4 and the second ply 5 at different azimuths about the central axis Z10 of the core, as can be seen clearly in FIG. 7B, so that said welds 4J, 5J are not superposed and do not cross, which avoids the creation of a weak zone or unevenness within the tire.

In addition, this longitudinal offset d0 makes it possible to avoid any interference between the first ply 4 and the second ply 5 when said plies 4, 5 are wrapped on the core 10, so that the second ply 5 does not hide the first ply 4 where the leading 4F and trailing 4R edges of said first ply 4 must be connected together to form the weld 4J of the first ply 4, and, reciprocally, the first ply 4 does not form an obstacle to the closure on itself of the second ply 5 at a second ply weld 5J, when the leading 5A and trailing 5R edges of said second ply 5 are connected together.

Preferably, as can be seen in FIGS. 5, 6, 7A and 7B, the transfer onto the core 10 takes place in a wrapping movement R3_R, R10 directed so that the progressive contact between the core 10 and the laminate 1 occurs, along the longitudinal direction L0, in a second direction F2 opposite to the first direction F1, and known as the "transfer application direction" F2, so that the transfer starts with the second trailing edge 5R of the second ply 5 and said transfer ends with the first leading edge 4F of the first ply 4 when the first trailing edge 4R of the first ply 4 and then the second leading edge 5F of the second ply 5 have been successively laid on the core 10 after the second trailing edge 5R of the second ply 5.

The laminate is thus firstly assembled on the first receiving surface 3A so that the first leading edge 4F, the second leading edge 5F, the first trailing edge 4R and the second trailing edge 5R are presented in this order, in the assembly direction F1, the second ply 5 being longitudinally set back by an offset value d0 relative to the first ply in this assembly direction F1, while the laminate 1 is then presented in the opposite direction for the transfer, so that it is detached from the first support 3 and the second trailing edge 5R, then the first trailing edge 4R, then the second leading edge 5F, which is connected to the second trailing edge 5R already present on the core 10, and finally the first leading edge 4F, which is connected to the first trailing edge 4R already present on the core 10, are laid in that order on the second support 10.

To this end, it will be noted that during the production of each ply 4, 5, the hoop 3 progresses, on the laying of each strip 6, 7, in a first rotation direction R3_F, known as the "forward direction" R3_F, which makes it possible to arrange said strips 6, 7 in the assembly direction F1, while during the transfer, the hoop 3 is rotated in an opposite second rotation direction R3_R, known as the "reverse direction" R3_R, in order to present the laminate 1 starting with the second trailing edge 5R.

As can be seen clearly in FIGS. 7A and 7B, due to the combination of a longitudinal offset d0 between the first ply 4 and the second ply 5 and the reversal of the direction of travel of the laminate 1 between assembly and transfer, the tail portion of the laminate 1, that is, the protruding portion of the second ply 5, which is between the first trailing edge 4R of the first ply 4 and the second trailing edge 5R of the second ply 5, i.e. initially not overlapping with the first ply 4, and which to some extent forms the overlayer of the laminate 1 on the first support 3, is then laid first on the core 10, to become the underlayer of said laminate 1 on the core 10, thus exposing a bare portion of the second ply 5, which is then covered, at the end of the wrapping turn on the core 10, by the head portion of the laminate, formed by the protruding portion of the first ply 4 between the second leading edge 5F of the second ply 5 and the first leading edge 4F of the first ply 4, i.e. initially not overlapping with the second ply 5.

As the head portion and the tail portion of the laminate 1 have complementary shapes and dimensions, they can be perfectly superposed, so that the laminate 1 advantageously closes on itself ensuring annular continuity of the second ply 5 and of the first ply 4, without creating a bulge, radial overthickness or radial step at the joins 4J, 5J between plies 4, 5 and more generally at the end portions of said plies 4, 5.

Preferably, as can be seen in particular in FIGS. 2A and 9, the first ply angle A6 gives the first ply 4 a (leading) first bevelled tip 4T that is delimited by the first leading edge 4F of said first ply and extends, in the longitudinal direction L0, over a length L_4T known as the "first tip length".

Similarly, the second ply angle A7 preferably gives the second ply 5 a (leading) second bevelled tip 5T delimited by the second leading edge 5F.

The second bevelled tip 5T is thus preferably placed set back from the first bevelled tip 4T, in the assembly direction F1, by a longitudinal offset value d0 greater than the first tip length L_4T.

Thus, by placing the second leading edge 5F of the second ply, at the very least the portion of said second leading edge 5F that is superposed on the first ply 4, beyond the base 4B of the first bevelled tip 4T in the assembly direction F1, said base 4B corresponding to the fictitious segment perpendicular to the longitudinal direction L0 that marks the fictitious boundary between said first bevelled tip 4T of the first ply and the adjacent full-width portion of said first ply 4, any interference between the plies 4, 5 during transfer by wrapping is avoided.

This also avoids any superposition, in particular any crossing, of the respective welds 4J, 5J of the first ply 4 and the second ply 5, which are made obliquely relative to the longitudinal direction L0, according to the aforementioned ply angles A6, A7.

Such an offset arrangement therefore advantageously avoids the creation of the slightest incipient tear within the laminate 1, once it has been wrapped in a ring about the central axis Z10 of the core 10.

As a result, the reinforcing belt thus obtained is particularly robust.

Of course, the arrangement of bevelled tips 4T, 5T longitudinally offset in the assembly direction F1, as described above with reference to the head portion of the laminate 1, is reproduced identically on the tail portion, where a trailing bevelled tip of the second ply 5, delimited by the second trailing edge 5R, follows, in the assembly direction F1, a trailing bevelled tip of the first ply 4 delimited by the first trailing edge 4R, at a distance having a longitudinal offset value d0 substantially or even exactly the same as between the leading bevelled tips 4T, 5T.

The open laminate 1 thus generally has a trapezoid shape before it is closed on itself and when opened out flat, as can be seen in FIG. 9.

According to a preferred arrangement, as the strips 6 forming the first ply 4 are juxtaposed, in the longitudinal direction L0, at a constant repeat pitch P6, known as the "first ply pitch" P6, the longitudinal offset d0 between the first tip 4T and the second tip 5T can advantageously correspond to a distance equal to the sum of the first tip length L_4T and an additional value d_add, said additional value d_add being between 20% and 80% of the first ply pitch P6, preferably between 30% and 75% of the first ply pitch P6, and more preferably 50% (i.e. half) of the first ply pitch P6, i.e.: d0=L_4T+d_add, where preferably d0=L_4T+(P6/2). It will be noted that such an arrangement can form an invention in its own right, applicable to the manufacturing of a laminate 1, whatever the intended use of the laminate and regardless of the details of any transfer of said laminate 1 from one support to another support.

Placing the second tip 5T, with which the second ply 5 starts, set back from the base 4B of the first tip 4T, here by a value equal to half of the first ply pitch P6, so that said second tip 5T starts substantially or even exactly facing the middle of the width W6 of the first strip 6 forming the first ply 4, in the longitudinal direction L0, ensures that the second leading edge 5F is sufficiently far away from the selvedges of said strip 6, and in particular from the first leading edge 4F corresponding to the selvedge of the first of said strips 6, which will avoid, after wrapping, any overlay and more particularly any crossing of the first weld 4J and the second weld 5J, and therefore any weakening of the laminate 1.

Preferably, during the method, a developed length L4 of the first ply is defined, to be given to the first ply 4 when it is produced by laying the first series of strips 6 on the hoop 3, and a first angular laying pitch P6_angular is calculated accordingly, corresponding to the first ply pitch P6 at which the strips 6 forming the first ply are positioned one after the other, about the central axis Z3 of the hoop, so that said first angular laying pitch P6_angular makes it possible to obtain the desired first ply developed length L4 with a first whole number N6_actual of strips 6.

More particularly, the following steps can be performed:

The ply length L4 to be produced is considered, as imposed by the dimension of the tire to be manufactured, and therefore by the dimension of the circumference of the core 10.

The desired theoretical ply angle, denoted A6_th, is also known, which typically depends on the angle to be given to the reinforcing threads 8 within the tire structure, as has been specified.

As the width W6 of the strips 6 is also known, and in practice is equal to the width W9 of the continuous band 9 from which said strips 6 originate, the first theoretical ply pitch P6_th is then equal to: P6_th=W6/sin(A6_th).

The theoretical number N6_th of strips 6 necessary to form the first ply 4 is equal to the desired length L4 divided by the first theoretical ply pitch P6 the N6_th=L4/P6_th.

As the actual number N6_actual of strips 6 can only be a whole number, this theoretical number N6_th is rounded, preferably to the nearest whole number.

A corrected actual first ply pitch P6_actual is then recalculated, corresponding to this actual whole number N6_actual of strips 6, which is therefore equal to the desired ply length L4 divided by the actual whole number of strips: P6_actual=L4/N6_actual.

As the width W6 of the strips 6 is a fixed value, adapting the first ply pitch requires adjusting the first ply angle accordingly, by selecting an actual ply angle value A6_actual that is both as close as possible to the desired theoretical ply angle A6_th and compatible with the corrected actual first ply pitch P6_actual; in practice, the actual ply angle A6_actual is therefore determined as being the arcsine of the width W6 of the strip 6 divided by the corrected actual first ply pitch P6_actual:

$$A6\_actual = \text{Arcsin}(W6/P6\_actual).$$

The angular laying pitch P6_angular represents the angular increment of the hoop 3 between the respective starting points of two successive strips 6, that is, the angle of rotation by which the hoop 3 must be rotated about the hoop axis Z3 so that the circumference of said hoop 3, that is the first receiving surface 3A, travels an arc distance equal to the corrected actual first ply pitch P6_actual.

Insofar as an angular increment of 2×Pi radians corresponds to a complete turn of the hoop 3, that is, an arc length equal to the entire perimeter of the first receiving surface 3A of said hoop 3 on which laying is carried out, that is D3×Pi, then the angular laying pitch P6_angular, which corresponds to the fraction represented by the corrected actual first ply pitch P6_actual relative to the total length of the perimeter of the first laying surface D3×Pi, therefore equals, as can be seen in FIG. 2A:

$$P6\_angular[rad] = 2 \times Pi \times P6\_actual/(D3 \times Pi) = 2 \times P6\_actual/D3.$$

In addition, the actual ply angle A6_actual, calculated as set out above, can likewise be used to determine the rotation angle, known as the "individual laying angle", denoted Theta 6 in FIG. 2A, that the hoop 3 must carry out during the laying of a strip 6 in order to distribute said strip 6 azimuthally about the central axis Z3 of the hoop over an arc length the developed length of which, denoted L6 in FIG. 9, and known as the "individual laying length" L6, corresponds to the value geometrically imposed by the selection of said actual ply angle A6_actual.

Opened out flat in FIG. 9, considering that the first ply 4 has, perpendicular to the longitudinal direction L0, a ply width W4, and on the condition that the ply angle in question equals the actual ply angle calculated above, i.e. A6=A6_actual, then the following equation is easily established:

$$\tan(A6\_actual) = W4/L6, \text{ which gives } L6 = W4/\tan(A6\_actual).$$

This individual laying length L6 is then converted into an angular value:

$$Theta6[rad] = 2 \times L6/D3 = 2 \times W4/(D3 \times \tan(A6\_actual)).$$

The same method can of course be used to correct the actual laying conditions of the second ply 5 in relation to the ideal desired theoretical conditions.

Preferably, a developed length L5 of the second ply 5 is thus defined, to be given to the second ply 5 when it is produced by laying the second series of strips 7 on the hoop 3, and a second angular laying pitch P7_angular is calculated accordingly, corresponding to the second ply pitch P7 at which the strips 7 forming the second ply 5 are positioned one after the other, about the central axis Z3 of the hoop, so that said second angular laying pitch P7_angular makes it possible to obtain the desired second ply developed length L5 with a second whole number N7_actual of strips 7.

In addition, according to a preferred feature, in order to define the second angular laying pitch P7_angular, the increase in the visible laying diameter on the hoop 3 can be taken into consideration, which increase is linked to the thickness H4 of the first ply 4 already present on the first receiving surface 3A of the hoop when the second ply 5 is produced.

The first ply 4 is assembled by laying the strips 6 on a bare receiving surface 3A, the visible diameter of which is therefore equal to the outer diameter D3 of said hoop 3, that is, the diameter D3 of said first receiving surface 3A.

In contrast, given that the second ply 5 is assembled by laying the strips 7 on top of the first ply 4, and therefore as an additional thickness to said first ply 4 (at least over the mutual overlap length of said first and second plies 4, 5), this means that, strictly, the surface on which the second ply 5 is laid is radially offset outwards relative to the bare surface of the first receiving surface 3A, by a value equal to the thickness H4 of the first ply 4, so that the visible diameter of the cylindrical surface on which the second ply 5 is laid is greater than the bare diameter D3 of the first laying surface 3A, and is in this case equal to the sum of the bare diameter D3 and twice the thickness H4 of the first ply (as one thickness must be added at each end of the bare diameter), i.e. D3+2×H4.

Having calculated the corrected actual second ply pitch P7_actual in order to obtain the desired length L5 of the second ply 5 with a whole number of strips 7, identically to the description given with reference to the first ply 4, the second angular laying pitch will thus be considered to be:

$$P7\_angular[rad] = 2 \times P7\_actual/(D3 + 2 \times H4)$$

The same process can be carried out, that is, taking into consideration the increase in the visible laying diameter linked to the presence of the first ply 4 on the first support 3, when defining the individual laying length of the strip 7 forming the second ply, and therefore the individual laying angle by which the hoop 3 must be rotated as said strip 7 forming the second ply 5 is applied on the first receiving surface 3A, on top of the first ply 4.

In addition, it will be noted that, depending on the specified requirements relating to the structure of the tire, the first ply 4 can have a width W4 (considered perpendicular to the longitudinal direction L0) equal to the width W5 of the second ply 5, or conversely different from said width W5 of the second ply.

According to a preferred possible arrangement, the width W5 of the second ply 5 can thus be greater than the width W4 of the first ply, as can be seen in FIGS. 2B and 6, which makes it possible in particular to give the laminate 1 a good robust, stable and evenly shaped seat at the shoulders of the tire, at the transition between the sidewalls of said tire and the crown of said tire holding the tread.

In any event, the width W5 and the position of the second ply 5 relative to the first ply 4 are such that widthways the second ply covers at least 50%, preferably at least 75%, and more preferably 100%, of the width W4 of the first ply 4, or even extends widthways beyond said first ply 4, preferably on either side of the lateral edges of said first ply 4, on each side of the longitudinal direction L0.

The first ply 4 and the second ply 5 are also preferably centered on the same common longitudinal direction L0 whatever their respective widths.

Preferably, during the assembly of the strips and/or during the transfer from the hoop 3 onto the core 10, the hoop 3 is rotated R3_F, R3_R by a drive system 21, 21' including a drive sprocket 22, 22' that meshes on a ring gear 23 rigidly connected to the hoop 3, said ring gear 23 being centered on the central axis Z3 of the hoop, and arranged so that the radius of its pitch circle for meshing with the drive sprocket 22, 22' is between 50% and 100%, preferably between 60% and 95%, and more preferably between 62% and 75% of the overall radius R3 of the radially outer surface of the hoop 3 forming the first receiving surface 3A. Here, said overall radius R3 is equal to half of the aforementioned hoop diameter D3: R3=D3/2.

Advantageously, such a drive system 21, 21', which acts at a distance from the central axis Z3 of rotation, as close as possible to the periphery of the hoop 3, and therefore as close as possible to the receiving surface 3A the movements of which are to be controlled, here more particularly the size of the azimuthal rotational movements and the absolute azimuthal position about the central axis Z3 of the hoop of which are to be controlled, makes possible a particularly accurate angular control that is little affected by backlash or the inertia of the hoop 3.

For the sake of compactness and simplicity of design, and in order not to interfere with the assembly of the plies 4, 5 and then the transfer of the laminate 1, the ring gear 23 is advantageously inscribed inside the cylindrical envelope formed by the first receiving surface 3A, and the teeth of said ring gear 23 are preferably oriented radially inwards, towards the central axis Z3 of the hoop 3, as can be seen clearly in FIGS. 1 and 5.

The drive sprocket 22, 22' can advantageously be driven by a motor, in particular an electric motor, the shaft of which is provided with an angular position sensor, for example an encoder.

Preferably, as can be seen in FIGS. 5 and 8A to 8E, the core 10 has a curved toroidal shape so that the second receiving surface 10A has, in cross-section in a plane containing the central axis Z10 of the core, a convex curved profile relative to the exterior (that is, domed towards the external environment of the rotational envelope formed by the core 10).

Preferably, the toroidal shape of the core 10 advantageously corresponds to the final shape of the tire to be manufactured.

Once the different constituent elements of the tire, including the laminate 1, have been laid on the core 10, the tire can thus then be cured (vulcanized) by placing said core 10 in a curing mold, having a shape that substantially complements the shape of the core 10, and the walls of which are thus applied against the tire.

Preferably, simultaneously with the counter-rotational movement R3_R, R10 making it possible to longitudinally unwrap the laminate 1 from the hoop 3 in order to wrap it on the circumference of the core 10, a roll-tilting movement β is imparted to the hoop 3, so as to move the bearing pressure exerted by the hoop 3 towards one side of the width of the convex curved profile of the second receiving surface 10A of the toroidal core 10, as illustrated in FIGS. 8A to 8E.

Here, the "width" of the core 10 and of its convex curved profile is given to mean the axial dimension of said core 10, considered parallel to the central axis Z10 of said core, perpendicular to the longitudinal direction L0. The roll-tilting 13 thus corresponds to a modification of the inclination of the hoop 3 about the tangent to the longitudinal direction L0.

Geometrically, the roll-tilting angle β corresponds to the angle formed, in a plane known as the "meridian plane" containing the central axis Z10 of the core and therefore perpendicular to the longitudinal direction L0 at the point in question, between the equatorial plane of the hoop 3, normal to the central axis Z3 of the hoop, and the equatorial plane P_EQ10 of the core 10, normal to the central axis Z10 of the core, and the intersection of which with the second receiving surface 10A of said core 10 preferably coincides with the longitudinal direction L0.

The roll-tilting angle β therefore indicates the lateral inclination of the hoop 3 relative to the equatorial plane P_EQ10 of the core, and therefore the lateral inclination of the bearing direction in which the hoop 3 exerts its bearing pressure in order to press the laminate 1 onto the core 10.

By convention, the roll-tilting angle β is zero when the central axis Z3 of the hoop is parallel and coplanar, that is collinear, with the central axis Z10 of the core, that is, when the equatorial plane of the hoop and the equatorial plane of the core are parallel, or even merged, as is the case in FIGS. 8B and 8D.

Preferably, the amplitude of the roll-tilting allows the hoop 3 to offset its bearing area on the core 10 to the lateral edges of the laminate 1, that is, to the extreme axial portions of the ply 4, 5, and more generally of the laminate 1, in order to accentuate the pressure on said lateral edges, during the laying of said laminate 1 on the core 10.

For example, when a tip 4T of the laminate 1, and in particular an end tip forming a boundary of the laminate 1 in the longitudinal direction L0, is laid on the core 10, the hoop 3 can thus preferably be tilted to the side of the core 10 (and therefore the corresponding side of the equatorial plane P_EQ10) on which said tip 4T is located, in order to exert a localized bearing and transfer pressure on said tip.

More uniform application of said tip will be promoted as a result, which in particular prevents said tip from lifting or moving on the core 10.

Preferably, the hoop 3 will be roll-tilted at least when the first tip of the laminate 1 is transferred, that is, when the tip by which the laminate 1 starts to contact and wrap onto the core 10 is laid on the core 10. Here, with reference to FIGS. 7A and 8A, the first tip is the tip that starts with the oblique second trailing edge 5R. At the start of the transfer, the hoop 3 will therefore be tilted to the side of the tip of the second trailing edge 5R, to the left in FIG. 8A.

This precaution is particularly useful when the ply that comes into contact with the receiving surface 10A of the core, here the second ply 5, has a width W5 strictly greater than the width W4 of the ply that is radially further out relative to the core 10, here the first ply 4, as illustrated in FIG. 6, so that said tip is not locally supported or stiffened by the first ply 4.

The hoop 3 can then, as the tip is transferred, return to the equatorial plane P_EQ10 of the core 10, as illustrated in FIG. 8B, here by tilting to the center in a left-to-right movement, or even cross said equatorial plane P_EQ10 by continuing its tilting movement to the right as illustrated in FIG. 8C, so that the bearing area of the hoop 3 substantially follows the path of the second trailing edge 5R from one lateral edge to the other lateral edge of the first tip, and more generally from one lateral edge to the other lateral edge of the laminate 1.

Preferably, having tilted (here at least to the left, then optionally to the right) in order to ensure the careful and accurate laying of the first tip of the laminate 1 on the core, the hoop 3 returns to the central position, that is, with a roll angle of substantially or exactly zero, as illustrated in FIG. 8D, in order to continue the balanced laying of the two-ply laminate 1.

More generally, preferably, when the tips are not being laid, when the central longitudinal portion of the laminate 1 along which the first and second plies 4, 5 overlap over their entire width W4, W5 is applied onto the core 10, the roll angle β of the hoop 3 is zero, so that flat laying is achieved, with pressure perpendicular to the central axis Z10 of the core (FIGS. 8B, 8D).

According to one possible variant, a (non-zero) roll-tilt can also be implemented at the end of the wrapping turn of the laminate 1 on the core 10, to accentuate the pressure of the hoop 3 on the end tip forming the rear boundary of the laminate 1 ending the laying of the laminate 1 on the core 10, here the tip 4T ending with the first leading edge 4F, as illustrated in FIG. 8E.

This advantageously makes it possible to obtain excellent quality of the weld 4J.

In particular, when the leading edge 4F is laid on the core 10, on top of the second ply 5 already wrapped on the core 10, a tilting movement can be performed which, in combination with the rotation of the core 10, allows the hoop 3 to travel over the laminate 1, here from right to left in FIG. 8E, to the lateral edge corresponding to the tip in question, for example starting from the center of the laminate (if the roll angle is initially zero), or starting from the opposite lateral edge of said laminate (if the hoop first tilts to the right before starting to return to the left), so that the trajectory of the bearing area of the hoop 3 with the laminate 1 substantially, or even exactly, follows at least part, or even all, of the path of the first join 4J, and in particular at least part of the path of the first join 4J containing the free end of the tip, that is, the end that reaches the core 10 last, here on the left in FIG. 8E.

More generally, it will be noted that the rolling mobility 13 of the hoop 3 allows the first receiving surface 3A of said hoop 3 to be (and to remain) tangent to the curved surface of the core 10 at the point at which the laminate 1 is applied at the time in question, and thus exert a bearing pressure substantially normal to said curved surface at the point in question.

This ensures that the laminate 1 follows the shape of the core 10 perfectly, including if the second receiving surface 10A has certain irregularities, in particular due to the shape of the plies 4, 5, or if a constituent underlayer of the tire is already present on said second receiving surface 10A when the laminate 1 is laid on it.

Preferably, both for simplicity of the movement and to ensure uniform longitudinal unwrapping/wrapping of the laminate 1 during the rolling movements of the hoop 3, the central axis Z3 of the hoop 3 remains in the same plane containing the central axis Z10 of the core, so that a simple lateral tilt is performed relative to said core 10.

According to a preferred feature that can form an invention in its own right, applicable to the transfer of a single ply or a multi-ply laminate 1, the same robotic arm 16 is used to first of all produce the ply or plies, here to produce the first and second plies 4, 5, and then to move the first support 3 and bring it into contact with the second support 10 in order to transfer the ply in question, here more particularly to transfer the laminate 1.

Using the same robotic arm 16 to assemble the plies on the hoop 3 and then transfer the laminate 1 onto the core 10 advantageously provides a very compact installation 2, with a small footprint, and within which, in particular, the ranges of movement and therefore the corresponding cycle times are particularly reduced.

Preferably, the robotic arm 16 has to this end an automated tool changing station 30, at which it can swap a laying tool 12, which is arranged to assemble the first ply 4 and/or the second ply 5, and more particularly to assemble a laminate 1 containing the first and second plies 4, 5, on the first support 3, preferably by laying juxtaposed strips 6, 7, for a gripper tool 31, which is arranged to grasp and handle the first support 3 so that it can transport said first support 3 to the core 10 and then transfer the first ply 4 and/or the second ply 5, and more preferably the laminate 1, onto said core 10.

Advantageously, the disclosure therefore makes it possible to share the same first support 3, here the hoop 3, as well as the same robotic arm 16, preferably single, between the station 32 for assembling the plies 4, 5 and the transfer station 33. In particular, one and the same shared hoop 3 forms both an assembly support and a support for transport and transfer onto the core 10, the robotic arm 16 allowing said hoop 3 to shuttle between the assembly station 32 and the transfer station 33.

The robotic arm 16 is reconfigured between the assembly station 32 and the transfer station 33, and vice versa, through an automatic change of tool 12, 31 during which a first tool 12, for example the aforementioned laying tool 12, initially fitted on the wrist 20, is preferably automatically detached from the wrist 20, in order to separate said first tool 12 from the wrist and place said first tool on standby in a storage area of the tool changing station 30, such as a rack 34 forming a tool store, and a second tool 32, for example the aforementioned gripper tool 31, is automatically engaged on the wrist 20 instead of the first tool 12.

As a variant, a wrist 20 could be provided having a pivoting head provided with two tools (the laying tool 12 and the gripper tool 31 respectively), which would therefore be suitable for switching between said tools as required.

However, it is preferable to fit one tool 12, 31 on the wrist 20 at a time, namely here either the laying tool 12 only or the gripper tool 31 only, in order to limit the footprint, together with the inertia and bending of the robotic arm 16, and consequently be able to increase dexterity and accuracy.

The laying tool 12 can be as described above, and thus include a pressing roller 13, a feeding device 14 conveying the continuous band 9, and a cutting device 15 dividing the strips 6, 7 on the fly.

The gripper tool 31 preferably comprises a clamping mechanism 35, arranged so that it can automatically grasp, and then release, a chassis 36 holding the hoop 3, and a drive system 21 as described above, comprising a drive sprocket 22 suitable for meshing on a ring gear 23 rigidly connected to the receiving surface 3A of the hoop 3, so that the hoop 3 can be rotated about its central axis Z3, relative to the chassis 36.

It will be noted that the installation 2 preferably comprises two drive systems 21, 21', namely a first "flying" drive system 21, incorporated into the gripper tool 31 and suitable for being fitted to the robotic arm 16 to allow the rotation of the hoop 3 during the transfer of the laminate 1, on the transfer station 33, and a second "fixed" drive system 21', incorporated into the assembly station 32, to allow the rotation of the hoop 3 during the assembly of the first ply 4 and then the second ply 5, while the robotic arm 16 is fitted with the laying tool 12 in order to generate and apply the strips 6, 7 onto the hoop 3.

Preferably, the two drive systems 21, 21' have a similar structure, and each comprise in particular a drive sprocket 22, 22' of the same type suitable for interacting with the ring gear 23, rigidly connected to the hoop 3, for rotating said hoop 3 relative to the chassis 36.

Likewise, the assembly station 32 preferably comprises a (second) "fixed" clamping mechanism 35' substantially identical to the (first) "flying" clamping mechanism 35 provided on the gripper tool 31 suitable for being fitted to the robotic arm 16. This fixed second clamping mechanism 35' makes it possible to lock the chassis 36 holding the hoop 3 on said assembly station 32, as can be seen in particular in FIG. 1.

More preferably, the chassis 36 holding the hoop 3, and which forms with said hoop 3 a sub-assembly that can be moved by the robotic arm 16 from the assembly station 32 to the transfer station 33 and vice versa, comprises a first retaining lug 37 and a second retaining lug 38, diametrically opposite the first retaining lug 37 relative to the central axis Z3 of the hoop.

These retaining lugs 37, 38 are arranged so that the first retaining lug 37 can be locked on the fixed clamping mechanism 35', when the hoop 3 occupies the assembly station 32, while the second retaining lug 38 can be grasped by the flying clamping mechanism 35 of the gripper tool 31, when the robotic arm 16 must grasp and move the hoop 3 to the transfer station 33, and then rotate the hoop on said transfer station 33.

Preferably, as the two clamping mechanisms 35, 35' are identical, the first and second retaining lugs 37, 38 in turn have an identical arrangement, and are symmetrical relative to a plane of symmetry containing the central axis Z3 of the hoop.

The clamping mechanisms 35, 35' can of course each comprise any type of automatically controlled jaw or lock, so that they can alternately engage with their respective retaining lug 38, 37.

An example of the operation of the installation 2 will now be described in more detail with reference to the figures provided.

Initially, the hoop 3 is at the assembly station 32, its chassis 36 being held by the fixed clamping mechanism 35' gripping the first retaining lug 37, as illustrated in FIG. 1.

The first ply 4 is assembled by laying a series of strips 6 juxtaposed by their selvedges on the first receiving surface 3A of the hoop 3. Each strip 6 is pressed against the hoop 3, from above, by means of the laying tool 12 held by the wrist 20 of the robotic arm 16. In order to ensure that each strip 6 is laid at the desired ply angle A6, a rotational movement R3_F (here by convention a forward rotation) of the hoop 3, driven by the drive sprocket 22' of the assembly station 32 engaging with the ring gear 23, is combined with a straight translational movement T20, here horizontal, of the wrist 20 of the robotic arm 16 and therefore of the laying tool 12. For each strip, the amplitude of the translational movement is substantially or even exactly equal to the width W4 of the first ply 4, while the amplitude of the rotational movement R3F, performed simultaneously, corresponds to the individual laying angle Theta 6 as calculated as set out above.

Advantageously, the vertical pressure of the pressing roller 13 of the laying tool 12 against the vertically highest point of the first receiving surface 3A of the hoop, vertically in line with the central axis Z3 of rotation, makes it possible to alleviate the weight of the robotic arm 16 and of the laying tool 12, which limits the bending phenomena and increases accuracy.

Once the first ply 4 has been formed, as illustrated in FIG. 2A, and the hoop 3 has first been angularly repositioned azimuthally in order to create the desired longitudinal offset d0, a similar process is carried out to form the second ply 5 from strips 7, superposed on the first ply 4 on the first receiving surface 3 to form the laminate 1 shown in FIG. 2B.

Once the second ply 5 has been formed, the robotic arm 16 travels to the tool changing station 30, where it detaches the laying tool 12 from the wrist 20, in order to place said laying tool 12 in a location provided to this end in the tool store 34, and then takes the gripper tool 31, which it fits to the wrist 20. This tool change is advantageously automatic.

Figure 3:
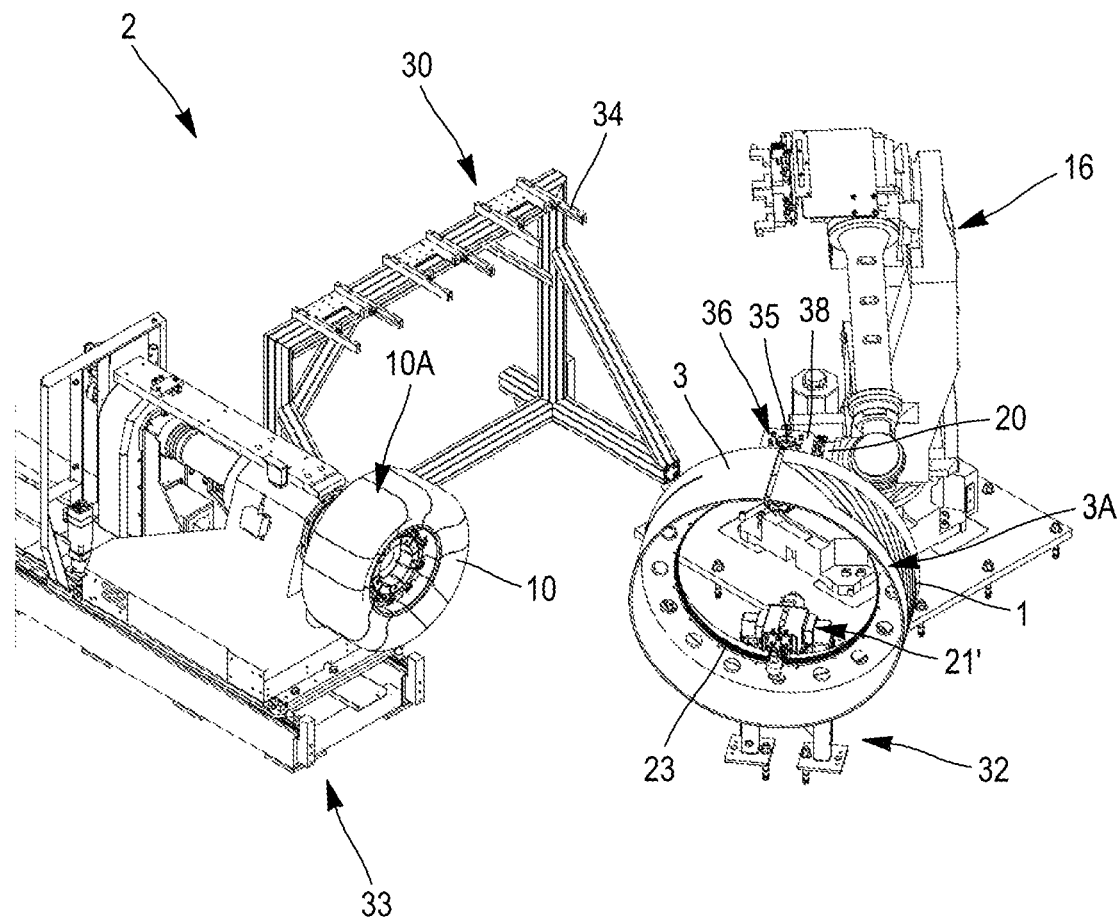
FIG. 3 illustrates a general perspective view of the installation in FIG. 1 in a configuration in which the robotic arm grasps the hoop in order to move it towards the core.

The robotic arm 16 then returns to the assembly station 32, where it grasps the chassis 36 of the hoop 3 by activating the flying clamping mechanism 35 held by the gripper tool 31 so that said flying clamping mechanism 35 engages with the second retaining lug 38 (FIG. 3).

The assembly station 32 then releases the hoop 3, by releasing the hold of the fixed clamping mechanism 35' on the first retaining lug 37.

The robotic arm 16 then transports the hoop 3 holding the laminate 1, with its chassis 36, to the transfer station 33.

Figure 4:
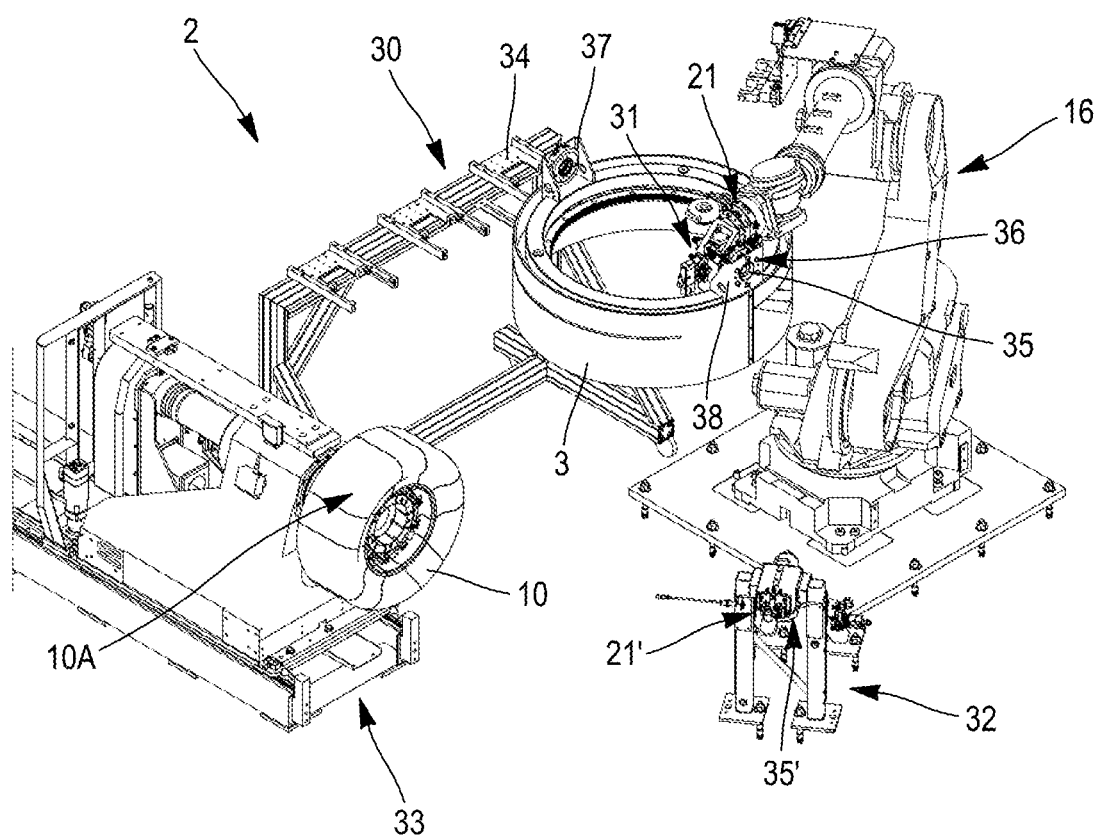
FIG. 4 illustrates a general perspective view of the installation in FIG. 3 during the movement of the hoop towards the core, in a phase of turning the hoop over.

Preferably, on the journey, the wrist 20 rotates, so that the hoop 3 is turned over vertically, as can be seen in the series of FIGS. 3, 4 and 5, so that the wrist 20 and the gripper tool 31, and more particularly its drive system 21, are at the bottom point of the hoop 3, and said hoop 3 is presented to the core 10 from above, so that the bottom point of the first receiving surface 3A of the hoop, holding the laminate 1, is placed on the crown of the core 10, preferably vertically in line with the central axis of rotation Z10 of the core 10, as illustrated in FIG. 5.

The laminate 1 is then transferred from the hoop 3 onto the core 10 by synchronously counter-rotating R3_R, R10 the hoop 3, driven by the drive system 21 incorporated into the gripper tool 31, and the core 10, held by a rotating shaft mounted on a fixed frame of the transfer station 33. It will be noted that here, the hoop 3 rotates in a reverse direction R3_R, which is counter to the forward direction R3_F applied to distribute the strips 6, 7 azimuthally on the circumference of the hoop 3 during the assembly of the plies 4, 5.

Advantageously, such a transfer configuration, according to which the hoop 3 rests and rolls on the top of the core 10, makes it possible not only to alleviate at least part of the weight of the hoop 3 and the gripper tool 31 on the robotic arm 16 during transfer, but also to accurately control the rotational movement R3_R of the hoop generated and driven by the drive system 21 of the gripper tool 31, as close as possible to the first receiving surface 3A from which the laminate 1 progressively detaches.

This results in a more accurate, stable transfer.

At the end of the one and only turn made by the core 10, the transfer is complete when the laminate 1 closes on itself in a ring, each of the first and second plies 4, 5 forming a join 4J, 5J of its respective ends 4F, 4R, 5F, 5R.

The robotic arm 16 then takes the empty hoop 3 back to the assembly station 32, where the fixed clamping mechanism 35' is activated to secure the first retaining lug 37 of said hoop 3 to said assembly station 32.

The robotic arm 16 then activates the clamping mechanism 35 incorporated into the gripper tool 31 so that it releases the second retaining lug 38, and moves to the tool changing station 30, where it swaps the gripper tool 31 for the laying tool 12.

The robotic arm 16, once again provided with said laying tool 12, is then presented facing the empty hoop 3 to start a new cycle for assembling plies 4, 5.

During this time, in the background, the core 10 holding the laminate 1 can be covered with additional layers forming the tire, for example a tread, and/or a circumferential wrap obtained by winding contiguous turns of a continuous band containing continuous longitudinal reinforcing threads, and then/or said core 10 holding the laminate 1 can be conveyed to a curing mold to vulcanize said tire, and more particularly the laminate 1.

A new empty core 10 can be positioned on the transfer station 33 to receive the next laminate 1.

A set of several cores 10 can of course be provided, making it possible to vulcanize the laminates, and more generally the tires, without interrupting the preparation cycle including the assembly and then the transfer of the successive laminates 1 on the successive cores 10.

In addition, prior to the production of the first and second plies 4, 5, the radius, the diameter D10 or the circumference of the core 10 is preferably measured, for example using a mechanical or optical feeler, in order to determine the developed length L10 of the circumference of the second receiving surface 10A, known as the "actual second receiving surface length" L10, and, during the step of producing the first and second plies 4, 5, the lengths L4, L5 given to the first and second plies 4, 5 respectively are adjusted as a function of this actual second receiving surface length L10 when said first and second plies 4, 5 are formed on the first receiving surface 3A.

In other words, due to the disclosure, instead of assembling plies 4, 5 and therefore a laminate 1 initially having an approximate length, and then adjusting said laminate to fit the circumference of the core 10 during transfer, that is later in the process, by stretching said laminate 1 to a greater or lesser extent by modifying the synchronization ratio between the respective rotation of the hoop R3_R and of the core R10 in order to compensate for any discrepancy between the initial length and the desired length of the laminate 1, the lengths L4, L5 of the plies 4, 5 are now adjusted very exactly earlier in the process, directly during the assembly step, so that on transfer, the laminate 1 has from the outset a length exactly adjusted to one wrap of said laminate on one turn of the core 10, and the length of which does not therefore need to be stretched or more generally modified in order to encase the core 10 and close precisely on itself, ensuring complete continuity of each layer formed by one of the first and second plies 4, 5.

The lengths L4, L5 of the first and second plies 4, 5 can be adjusted during assembly by adjusting the ply angle values A6, A7, and therefore the laying pitch values P6, P7 used, as explained above.

It will be noted that deducing the exact lengths L4, L5 to be given to the first and second plies 4, 5 during assembly from the measurement of the dimensions of the core 10 has several advantages.

A first advantage is that it makes the method very versatile, as any change in dimension of the core 10 is noticed immediately, and the assembly of the plies 4, 5 adjusted accordingly. The installation thus adapts quickly and automatically to "dimension changes", that is to changes in the run of tires to be manufactured, which allows greater responsiveness for short production runs calling for frequent dimension changes.

A second advantage relates to the fact that it is mechanically more difficult to stretch a laminate 1 containing several superposed plies than a thinner monolayer structure containing a single ply, due to the intrinsic stiffness of such a laminate 1, which is much greater than the individual stiffness of the layers forming it. As a result, the method consisting of correcting the length by stretching on transfer, as is known for adjusting the length of single plies, is likely to be unsuitable for managing the length of a laminate 1.

A third advantage relates to the fact that, if the length of the laminate was to be adjusted by stretching, the stretching would act simultaneously on the two plies 4, 5 forming said laminate 1. It is possible, or even probable, that in most cases a given adjustment of the length of the first ply 4, to allow the weld 4J of the first ply to be made satisfactorily, would not be acceptable for the second ply 5, which would require a different adjustment or even no adjustment.

If both plies 4, 5 were acted upon simultaneously by general stretching of the laminate 1 at a late stage, that is after the formation of the laminate 1 and for example on transfer of said laminate 1 onto the core 10, the modification of the length of the first ply 4, intended to guarantee a perfect weld 4J of the first ply on itself, would thus also result in the modification of the length of the second ply 5, due to the coupling of the plies 4, 5 grouped together in the laminate 1, which could detract from the quality of the weld 5J of said second ply 5.

Advantageously, by dealing with the problem of the length of the plies L4, L5 early in the process, so that the length L4, L5 that will guarantee an acceptable weld 4J, 5J of the ply 4, 5 in question is defined individually for each of the plies 4, 5 during assembly, the disclosure makes it possible to ensure individual, separate control of each of said welds 4J, 5J.

The feeler for evaluating the actual second receiving surface length L10 can evaluate said length L10 either directly, by measuring the circumference of the core 10, for example by applying a free roller associated with an angular sensor, such as a resolver, driven by the surface of the core through friction, to the circumferential surface of the core, or indirectly by measuring another dimension representative of said length, such as the diameter D10 of the core or the radius of said core 10.

Said feeler can for example be held by the robotic arm 16 and approach centripetally to feel the receiving surface 10A of the core while the core is rotated about its central axis Z10.

Of course, the disclosure also relates as is to a method for manufacturing a pneumatic tire during which, according to any one of the aforementioned features, a laminate 1 is produced comprising a first ply 4 formed by a series of uncured rubber-based strips 6, preferably containing continuous reinforcing threads 8 arranged parallel in the direction of the length of said strips 6, and a second ply 5 formed by a series of uncured rubber-based strips 7, preferably containing continuous reinforcing threads 8 arranged parallel in the direction of the length of said strips 7, and said laminate 1 is then transferred onto the core 10, and said core 10 is placed in a curing mold in order to vulcanize said laminate 1, and more generally in order to vulcanize the whole tire.

Preferably, the first ply 4 and the second ply 5 correspond to "crown plies", forming crossed reinforcers, which are superposed on a carcass ply, so that the reinforcing threads 8 generally form, when superposed, triangular reinforcing structures of the tire. In addition, further layers forming the crown of the tire, such as a circumferential wrap and a tread, can be placed on the core on top of the first and second plies 4, 5 before vulcanization.

In any case, the core 10 is preferably "dimensional", in that it has the final shapes and dimensions of the tire sought, and therefore allows vulcanization of said tire as is, said tire remaining in contact with said core 10 during vulcanization, with no need to carry out additional shaping of said tire inside the mold, for example by inflation.

Of course, the disclosure is in no way limited to the variant embodiments described above, and a person skilled in the art could particularly isolate or freely combine any of the aforementioned features, or replace them with equivalent features.

What is claimed is:

1. Method for manufacturing an annular laminate suitable for use in the formation of a pneumatic tire, during which:
    a first ply, extending in a longitudinal direction from a first leading edge to a first trailing edge, is produced on a first support having a first receiving surface,
    then, on the same first support, a second ply is produced on top of the first ply, extending in the longitudinal direction from a second leading edge to a second trailing edge, so that a laminate is obtained on the first support, the thickness of which extends from a first face, applied against the first receiving surface, to an opposite second face, and comprising, in said thickness, at least a first layer, formed by the first ply, and a second layer, formed by the second ply, so that the first ply is sandwiched between the second ply and the first receiving surface,
said laminate is then transferred to a second support, known as the "core", having a second receiving surface exhibiting symmetry of revolution centered on a central axis, said transfer being carried out by applying the second face of the laminate against the second receiving surface of the core and wrapping said laminate on the circumference of said second receiving surface until the second leading edge forms a join with the second trailing edge, thus closing the second ply on itself, and the first leading edge forms a join with the first trailing edge, thus closing the first ply on itself, so that said laminate is closed on itself in a ring about the central axis of the core,
    wherein the first support is formed by a circular cylindrical hoop, centered on an axis known as the "central hoop axis", the radially outer surface of which forms the first receiving surface, and the circumference of which is strictly greater than the circumference of the core, and wherein the transfer is carried out by applying said hoop holding the laminate against the core so that the laminate is sandwiched between the first receiving surface of the hoop and the second receiving surface of the core, and then setting the hoop and the core in relative counter-rotational motion, and
    wherein the hoop is rotated by a drive system including a drive sprocket that meshes on a ring gear rigidly connected to the hoop, said ring gear being centered on the central axis of the hoop, and arranged so that the radius of its pitch circle for meshing with the drive sprocket is between 62% and 75% of the overall radius of the radially outer surface of the hoop forming the first receiving surface.

2. Method for manufacturing an annular laminate suitable for use in the formation of a pneumatic tire, during which:
    a first ply, extending in a longitudinal direction from a first leading edge to a first trailing edge, is produced on a first support having a first receiving surface,
    then, on the same first support, a second ply is produced on top of the first ply, extending in the longitudinal direction from a second leading edge to a second trailing edge, so that a laminate is obtained on the first support, the thickness of which extends from a first face, applied against the first receiving surface, to an opposite second face, and comprising, in said thickness, at least a first layer, formed by the first ply, and a second layer, formed by the second ply, so that the first ply is sandwiched between the second ply and the first receiving surface,
    said laminate is then transferred to a second support, known as the "core", having a second receiving surface exhibiting symmetry of revolution centered on a central axis, said transfer being carried out by applying the second face of the laminate against the second receiving surface of the core and wrapping said laminate on the circumference of said second receiving surface until the second leading edge forms a join with the second trailing edge, thus closing the second ply on itself, and the first leading edge forms a join with the first trailing edge, thus closing the first ply on itself, so that said laminate is closed on itself in a ring about the central axis of the core,
    wherein the same robotic arm is used to first of all produce the first and second plies, and then to move the first support and bring it into contact with the second support in order to transfer the laminate, and
    wherein said robotic arm has to this end an automated tool changing station, at which it can swap a laying tool, arranged to assemble the first and second plies on the first support by laying juxtaposed strips, for a gripper tool, arranged to grasp and handle the first support so that it can transport said first support to the core and then transfer the laminate onto said core.

3. Method for manufacturing an annular laminate suitable for use in the formation of a pneumatic tire, during which:
    a first ply, extending in a longitudinal direction from a first leading edge to a first trailing edge, is produced on a first support having a first receiving surface by laying a first series of strips directly on the first receiving surface and butting the first series of strips against one another,
    then, on the same first support, a second ply is produced on top of the first ply by laying a second series of strips directly on the first ply and butting the second series of strips against one another, extending in the longitudinal direction from a second leading edge to a second trailing edge, so that a laminate is obtained on the first support, the thickness of which extends from a first face, applied against the first receiving surface, to an opposite second face, and comprising, in said thickness, at least a first layer, formed by the first ply, and a second layer, formed by the second ply, so that the first ply is sandwiched between the second ply and the first receiving surface, said laminate is then transferred to a second support, known as the "core", having a second receiving surface exhibiting symmetry of revolution centered on a central axis, said transfer being carried out by applying the second face of the laminate against the second receiving surface of the core and wrapping said laminate on the circumference of said second receiving surface until the second leading edge forms a join with the second trailing edge, thus closing the second ply on itself, and the first leading edge forms a join with the first trailing edge, thus closing the first ply on itself, so that said laminate is closed on itself in a ring about the central axis of the core.

4. The method according to claim 3, wherein, on the first support, the second ply has a longitudinal offset relative to the first ply, so that, travelling along the laminate along the longitudinal direction in a first direction, known as the "assembly direction", the first leading edge, with which the first ply starts, precedes the second leading edge, with which the second ply starts, so that the first ply remains visible and not covered by the second ply between the first leading edge and the second leading edge, while the first trailing edge, with which the first ply ends, precedes the second trailing edge, with which the second ply ends, so that the second ply covers the first trailing edge of the first ply, and extends longitudinally beyond the first ply, and in that the transfer onto the core takes place in a wrapping movement directed so that the progressive contact between the core and the laminate occurs, along the longitudinal direction, in a second direction opposite to the first direction, and known as the "transfer application direction", so that the transfer starts with the second trailing edge of the second ply and said transfer ends with the first leading edge of the first ply when the first trailing edge of the first ply and then the second leading edge of the second ply have been successively laid on the core.

5. The method according to claim 3, wherein the same robotic arm is used to first of all produce the first and second plies, and then to move the first support and bring it into contact with the second support in order to transfer the laminate, and wherein said robotic arm has to this end an automated tool changing station, at which it can swap a laying tool, arranged to assemble the first and second plies on the first support by laying juxtaposed strips, for a gripper tool, arranged to grasp and handle the first support so that it can transport said first support to the core and then transfer the laminate onto said core.

6. The method according to claim 3, wherein a first ply developed length is defined, to be given to the first ply when it is produced by laying the first series of strips on the hoop, together with a second ply developed length, to be given to the second ply when it is produced by laying the second series of strips on the hoop, and a first angular laying pitch is calculated accordingly, corresponding to the first ply pitch at which the strips forming the first ply are positioned one after the other, about the central axis of the hoop, so that said first angular laying pitch makes it possible to obtain the desired first ply developed length with a first whole number of strips and, likewise, a second angular laying pitch is calculated, corresponding to the second ply pitch at which the strips forming the second ply are positioned one after the other, about the central axis of the hoop, so that said second angular laying pitch makes it possible to obtain the desired second ply developed length with a second whole number of strips, and wherein, in order to define the second angular laying pitch, the increase in the visible laying diameter on the hoop is taken into consideration, which increase is linked to the thickness of the first ply already present on the first receiving surface of the hoop when the second ply is produced.

7. The method according to claim 3, wherein, prior to the production of the first and second plies, the radius, the diameter or the circumference of the core is measured in order to determine the developed length of the circumference of the second receiving surface, known as the "actual second receiving surface length", and, during the step of producing the first and second plies, the lengths given to the first and second plies respectively are adjusted as a function of this actual second receiving surface length when said first and second plies are formed on the first receiving surface.

8. The method for manufacturing a pneumatic tire during which, according to claim 3, a laminate is produced comprising a first ply formed by a series of uncured rubber-based strips containing continuous reinforcing threads arranged parallel in the direction of the length of said strips, and a second ply formed by a series of uncured rubber-based strips containing continuous reinforcing threads arranged parallel in the direction of the length of said strips, and said laminate is then transferred onto the core, and said core is placed in a curing mold in order to vulcanize said laminate.

9. The method according to claim 3, wherein the first support is formed by a circular cylindrical hoop, centered on an axis known as the "central hoop axis", the radially outer surface of which forms the first receiving surface, and the circumference of which is strictly greater than the circumference of the core, and wherein the transfer is carried out by applying said hoop holding the laminate against the core so that the laminate is sandwiched between the first receiving surface of the hoop and the second receiving surface of the core, and then setting the hoop and the core in relative counter-rotational motion.

10. The method according to claim 9, wherein the hoop is rotated by a drive system including a drive sprocket that meshes on a ring gear rigidly connected to the hoop, said ring gear being centered on the central axis of the hoop, and arranged so that the radius of its pitch circle for meshing with the drive sprocket is between 62% and 75% of the overall radius of the radially outer surface of the hoop forming the first receiving surface.

11. The method according to claim 9, wherein the core has a curved toroidal shape so that the second receiving surface has, in cross-section in a plane containing the central axis of the core, a convex curved profile relative to the exterior, and wherein, simultaneously with the counter-rotational movement making it possible to longitudinally unwrap the laminate from the hoop in order to wrap it on the circumference of the core, a roll-tilting movement is imparted to the hoop, so as to move the bearing pressure exerted by the hoop towards one side of the width of the convex curved profile of the second receiving surface of the toroidal core.

12. The method according to claim 3, wherein the strips forming the first ply are laid at a first angle known as the "first ply angle", non-zero relative to the longitudinal direction, while the strips forming the second ply are laid at a second angle, known as the "second ply angle", different from the first ply angle so that the strips forming the second ply form a crossed structure with the strips forming the first ply.

13. Method according to claim 12, wherein the first ply angle gives the first ply a first bevelled tip that is delimited by the first leading edge of said first ply and extends, in the longitudinal direction, over a length known as the "first tip length", and in that the second ply angle gives the second ply a second bevelled tip delimited by the second leading edge, and in that the second bevelled tip is placed set back from the first bevelled tip, in the assembly direction, by a longitudinal offset value greater than the length of the first tip.

14. The method according to claim 13, wherein the strips forming the first ply are juxtaposed, in the longitudinal direction, at a constant repeat pitch, known as the "first ply pitch", and the longitudinal offset between the first tip and the second tip corresponds to a distance equal to the sum of the first tip length and an additional value, said additional value being between between 30% and 75% of the first ply pitch.

* * * * *